United States Patent
Sehlstedt et al.

(10) Patent No.: US 11,862,180 B2
(45) Date of Patent: Jan. 2, 2024

(54) SPECTRAL SHAPE ESTIMATION FROM MDCT COEFFICIENTS

(71) Applicant: Telefonaktiebolaget LM Ericsson (publ), Stockholm (SE)

(72) Inventors: Martin Sehlstedt, Luleå (SE); Jonas Svedberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 204 days.

(21) Appl. No.: 17/432,260

(22) PCT Filed: Feb. 20, 2020

(86) PCT No.: PCT/EP2020/054523
§ 371 (c)(1),
(2) Date: Aug. 19, 2021

(87) PCT Pub. No.: WO2020/169757
PCT Pub. Date: Aug. 27, 2020

(65) Prior Publication Data
US 2022/0189490 A1 Jun. 16, 2022

Related U.S. Application Data

(60) Provisional application No. 62/808,587, filed on Feb. 21, 2019, provisional application No. 62/808,610, (Continued)

(51) Int. Cl.
*G10L 19/005* (2013.01)
*G10L 19/02* (2013.01)
(Continued)

(52) U.S. Cl.
CPC .......... *G10L 19/005* (2013.01); *G06F 17/142* (2013.01); *G10L 19/02* (2013.01);
(Continued)

(58) Field of Classification Search
CPC .................................................. G10L 19/005
See application file for complete search history.

(56) References Cited

U.S. PATENT DOCUMENTS

| | | | | |
|---|---|---|---|---|
| 7,203,717 B1 * | 4/2007 | Absar | .................. | G06F 17/142 708/402 |
| 2004/0088160 A1 * | 5/2004 | Manu | .................. | G10L 19/0212 704/203 |

(Continued)

FOREIGN PATENT DOCUMENTS

| | | |
|---|---|---|
| EP | 3 125 239 A1 | 2/2017 |
| EP | 3 176 781 A2 | 6/2017 |

(Continued)

OTHER PUBLICATIONS

Ito, Akinori, et al. "Improvement of packet loss concealment for MP3 audio based on switching of concealment method and estimation of MDCT signs." 2010 Sixth International Conference on Intelligent Information Hiding and Multimedia Signal Processing. IEEE, 2010. (Year: 2010).*

(Continued)

*Primary Examiner* — Shaun Roberts
(74) *Attorney, Agent, or Firm* — Sage Patent Group

(57) ABSTRACT

A method, decoder, and program code for controlling a concealment method for a lost audio frame is provided. A first audio frame and a second audio frame of the received audio signal are decoded to obtain modified discrete cosine transform (MDCT) coefficients. Values of a first spectral shape based upon the MDCT coefficients decoded from the first audio frame decoded and values of a second spectral shape based upon MDCT coefficients decoded from the second audio frame decoded are determined, the spectral shapes each comprising a number of sub-bands. The values of the spectral shapes and frame energies of the first audio frame and second audio frame are transformed into repre- (Continued)

sentations of FFT based spectral analyses. A transient condition is detected based on the representations of the FFTs. Responsive to detecting the transient condition, the concealment method is modified by selectively adjusting a spectrum magnitude of a substitution frame spectrum.

22 Claims, 9 Drawing Sheets

Related U.S. Application Data filed on Feb. 21, 2019, provisional application No. 62/808,600, filed on Feb. 21, 2019.

(51) Int. Cl.
| | |
|---|---|
| *G10L 25/18* | (2013.01) |
| *H04L 65/75* | (2022.01) |
| *G10L 25/45* | (2013.01) |
| *H04L 65/80* | (2022.01) |
| *G06F 17/14* | (2006.01) |

(52) U.S. Cl.
CPC ...... *G10L 19/0204* (2013.01); *G10L 19/0212* (2013.01); *G10L 25/18* (2013.01); *G10L 25/45* (2013.01); *H04L 65/75* (2022.05); *H04L 65/80* (2013.01)

(56) References Cited

U.S. PATENT DOCUMENTS

| | | | |
|---|---|---|---|
| 2007/0100606 A1* | 5/2007 | Rogers | G10L 19/26 704/E19.045 |
| 2009/0063137 A1* | 3/2009 | Tsai | G10L 19/0212 704/200.1 |
| 2013/0144632 A1 | 6/2013 | Sang | |
| 2015/0228287 A1* | 8/2015 | Bruhn | G10L 19/0017 704/500 |
| 2015/0371641 A1 | 12/2015 | Bruhn | |
| 2017/0178648 A1* | 6/2017 | Schug | G10L 19/022 |
| 2017/0372707 A1* | 12/2017 | Biswas | G10L 19/0212 |

FOREIGN PATENT DOCUMENTS

| | | |
|---|---|---|
| JP | 2007512546 A | 5/2007 |
| JP | 2008129541 A | 6/2008 |
| JP | 2014531056 A | 11/2014 |
| JP | 2016038435 A | 3/2016 |
| JP | 2016510432 A | 4/2016 |
| WO | 2002071389 A1 | 7/2004 |
| WO | WO 2015/003027 A1 | 1/2015 |

OTHER PUBLICATIONS

Lecomte, Jérémie, et al. "Packet-loss concealment technology advances in EVS." 2015 IEEE International Conference on Acoustics, Speech and Signal Processing (ICASSP). IEEE, 2015. (Year: 2015).*
Bruhn, Stefan, et al. "A novel sinusoidal approach to audio signal frame loss concealment and its application in the new evs codec standard." 2015 IEEE International Conference on Acoustics, Speech and Signal Processing (ICASSP). IEEE, 2015. (Year: 2015).*
International Search Report of the International Searching Authority, PCT/EP2020/054522, dated Jun. 8, 2020, 4 pages.
International Search Report of the International Searching Authority, PCT/EP2020/054520, dated Jul. 7, 2020, 5 pages.
ETSI TS 126 445 V13.4.1 (Apr. 2017), 3GPP TS 26.445 version 13.4.1 Release 13, Universal Mobile Telecommunications System (UMTS); LTE; Codec for Enhanced Voice Services (EVS); Detailed algorithmic description, 661 pages.
ETSI TS 103 634 V0.1.1 (Jun. 2019), Digital Enhanced Cordless Telecommunications (DECT); Low Complexity Communication Codec Plus (LC3plus); XP14345925A, 152 pages.
Jacobsen et al., "Fast, Accurate Frequency Estimators", IEEE Signal Processing Magazine, May 2007, pp. 123-125.
Allie et al., "A Root of Less Evil", IEEE Signal Processing Magazine, Mar. 2005, pp. 93-96.
3GPP TS 26.447 V15.0.0 (Jun. 2018), Release 15, pp. 58-62.
3GPP TS 26.445 V15.1.0 (Dec. 2018), Release 15, pp. 570-571.
3GPP TS 26.445 V15.1.0 (Dec. 2018), Release 15, pp. 267-271.
International Search Report of the International Searching Authority, PCT/EP2020/054523, dated Jun. 15, 2020, 4 pages.
Japanese Office Action for Japanese Patent Application No. 2021-547686, dated Dec. 6, 2022, 3 pages.

* cited by examiner

SPECTRAL SHAPE ESTIMATION FROM MDCT COEFFICIENTS

CROSS REFERENCE TO RELATED APPLICATIONS

This application is a 35 U.S.C. § 371 national stage application of PCT International Application No. PCT/EP2020/054523 filed on Feb. 20, 2020, which claims the benefit of U.S. Provisional Application No. 62/808,587, filed on Feb. 21, 2019, U.S. Provisional Patent Application No. 62/808,600, filed on Feb. 21, 2019, and U.S. Provisional Application No. 62/808,610, filed on Feb. 21, 2019 the disclosures and contents of which are incorporated by reference herein in their entireties.

TECHNICAL FIELD

The invention relates generally to a method of concealing a lost audio frame associated with a received audio signal. The invention also relates to a decoder configured to conceal a lost audio frame associated with a received coded audio signal.

BACKGROUND

Transmission of speech/audio over modern communications channels/networks is mainly done in the digital domain using a speech/audio codec. This may involve taking the analog signal and digitalizing it using sampling and analog to digital converter (ADC) to obtain digital samples. These digital samples may be further grouped into frames that contain samples from a consecutive period of 10-40 ms depending on the application. These frames may then be processed using a compression algorithm, which reduces the number of bits that needs to be transmitted and which may still achieve as high quality as possible. The encoded bit stream is then transmitted as data packets over the digital network to the receiver. In the receiver, the process is reversed. The data packets may first be decoded to recreate the frame with digital samples which may then be inputted to a digital to analog converter (DAC) to recreate the approximation of the input analog signal at the receiver. FIG. 1 provides an example of a block diagram of an audio transfer using audio encoder and decoder over a network, such as a digital network, using the above-described approach.

When the data packets are transmitted over the network there can be data packets that may either be dropped by the network due to traffic load or dropped as a result of bit errors making the digital data invalid for decoding. When these events happen, the decoder needs to replace the output signal during periods where it is impossible to do the actual decoding. This replacement process is typically called frame/packet loss concealment. FIG. 2 illustrates a block diagram of a decoder 200 including packet loss concealment. When a Bad Frame Indicator (BFI) indicates lost or corrupted frame, PLC 202 may create a signal to replace the lost/corrupted frame. Otherwise, i.e. when BFI does not indicate lost or corrupted frame, the received signal is decoded by a stream decoder 204. A frame erasure may be signalled to the decoder by setting the bad frame indicator variable for the current frame active, i.e. BFI=1. The decoded or concealed frame is then input to DAC 206 to output an analog signal. Frame/packet loss concealment may also be referred to as error concealment unit (ECU).

There are numerous ways of doing packet loss concealment in a decoder. Some examples are replacing the lost frame with silence and repeating the last frame (or decoding of the last frame parameters. Other solutions try to replace the frame with the most likely continuation of the audio signal. For noise like signals, one solution generates noise with a similar spectral structure. For tonal signals, one may first estimate the characteristics of present tones (frequency, amplitude, and phase) and use these parameters to generate a continuation of the tones at the corresponding temporal locations of lost frames.

An example of another embodiment of an ECU is the Phase ECU, originally described in international patent application no. WO2014123470, where the decoder may continuously save a prototype of the decoded signal during normal decoding. This prototype may be used in case of a lost frame. The prototype is spectrally analyzed, and the noise and tonal ECU functions are combined in the spectral domain. The Phase ECU identifies tones and calculates a spectral temporal replacement of related spectral bins. The other bins may be handled as noise and are scrambled to avoid tonal artifacts in these spectral regions. The resulting recreated spectrum is inverse FFT (fast Fourier transform) transformed into time domain and the signal is processed to create a replacement of the lost frame.

Most signals rarely continue over long periods of time. To better handle error burst, the ECUs may use low resolution spectral estimates of the current input signal as a long term background estimate. During longer bursts, the ECU may change the target for the reconstruction over time. Initially the target is to replace the last signal. Over time the target may be changed over to a low resolution background estimate that would make the estimate more noise like, and eventually moved to a target of muting the output.

For packet loss concealment, one needs a low-resolution spectral representation of the current input. In embodiments described in international patent application no. WO2014123471 (see Appendix 1), the spectral representation may be created from two short FFT, each one being a quarter of the prototype frame and used for the transient detection. With short transforms, estimates may have high variance. To obtain a more stable long-term estimate, the average of the two FFTs may be used. In these embodiments, the FFT bins are grouped into sub-bands that approximately represents a critical band in the auditory system.

The long-term estimate may be used as a target spectrum in longer error bursts so that over time, the lost frames may be replaced with a signal that represents the current input background signal.

The drawback with this approach is that the short FFTs add substantial complexity in the first error frame. The first error frame already has high complexity as it used to do the complete PLC chain of spectral analysis, sinusoid location and temporal compensation of sinusoid components before one can do the reconstruction of the lost signal.

In such a case, the two short FFT (located at each side of the overall prototype frame) may also be used for a spectral transient detector (detecting onsets and offsets). Therefore, any replacement must be accurate enough to also be used for that purpose More information on how the Phase ECU PLC works can be found in international patent application no. WO2014123471 (see Appendix 1) and 3GPP TS 26.447 V15.0.0 clause 5.4.3.5.

SUMMARY

Various embodiments of the inventive concepts that are disclosed herein may arise from the present realization that the short FFTs add substantial complexity in the first error frame. The first error frame already has high complexity as it is used to do the complete PLC chain of spectral analysis, sinusoid location and temporal compensation of sinusoid components before one can do the reconstruction of the lost signal.

According to some embodiments of inventive concepts, methods are provided to control a concealment method for a lost audio frame associated with a received audio signal. In such methods, a first audio frame of the received audio signal is decoded to obtain modified discrete cosine transform, MDCT coefficients. Values of a first spectral shape are determined based upon the MDCT coefficients decoded from the first audio frame decoded, the first spectral shape comprising a number of sub-bands. A second audio frame of the received audio signal is decoded to obtain MDCT coefficients for the second audio frame. Values of a second spectral shape are determined based upon MDCT coefficients decoded from the second audio frame decoded, the second spectral shape comprising the number of sub-bands. The values of the first spectral shape and a first frame energy of the first audio frame are transformed into a first representation of a first fast Fourier transform, FFT, based spectral analysis and the values of the second spectral shape and a second frame energy of the second audio frame are transformed into a second representation of a second FFT spectral analysis. A transient condition is detected based on the first representation of the first FFT and the second representation of a second FFT. Responsive to detecting the transient condition, the concealment method is modified by selectively adjusting a spectrum magnitude of a substitution frame spectrum.

According to some embodiments of inventive concepts, a decoder apparatus is provided to control a concealment method for a lost audio frame associated with a received audio signal. The decoder apparatus decodes a first audio frame of the received audio signal to obtain modified discrete cosine transform, MDCT, coefficients. The decoder apparatus determines values of a first spectral shape based upon MDCT coefficients decoded from the audio frame decoded, the first spectral shape comprising a number of sub-bands. The decoder apparatus decodes a second audio frame of the received audio signal. The decoder apparatus determines values of a second spectral shape based upon MDCT coefficients decoded from the second audio frame decoded, the second spectral shape comprising the number of sub-bands. The decoder apparatus transforms the values of the first spectral shape and a first frame energy of the first audio frame into a first representation of a first fast Fourier transform, FFT, based spectral analysis and transforms the values of the second spectral shape and a second frame energy of the second audio frame into a second representation of a second FFT spectral analysis. The decoder apparatus detects, based on the first representation of the first FFT and the second representation of a second FFT, a transient condition. The decoder apparatus responsive to detecting the transient condition, modifies the concealment method by selectively adjusting a spectrum magnitude of a substitution frame spectrum.

According to some embodiments of inventive concepts, a method by a computer processor for controlling a concealment method for a lost audio frame associated with a received audio signal is provided. The method includes decoding a first audio frame of the received audio signal based on a modified discrete cosine transform, MDCT. The method includes determining values of a first spectral shape based upon decoded MDCT coefficients from the decoded audio frame and storing the calculated values of the first spectral shape in a shape$_{old}$ buffer, the first spectral shape comprising a number of sub-bands. The method includes determining a first frame energy of the audio frame and storing the calculated first frame energy in an E_w$_{old}$ buffer. The method includes decoding a second audio frame of the received audio signal. The method includes moving the calculated values of the first spectral shape from the shape$_{old}$ buffer to a shape$_{oold}$ buffer. The method includes moving the calculated first frame energy from the E_w$_{old}$ buffer to an E_w$_{oold}$ buffer. The method includes determining values of a second spectral shape based upon decoded MDCT coefficients from the decoded second audio frame and storing the calculated values of the second spectral shape in the shape$_{old}$ buffer the second spectral shape comprising the number of sub-bands. The method includes determining (915) a second frame energy of the second audio frame and storing the calculated second frame energy in the E_w$_{old}$ buffer. the method includes transforming the values of the first spectral shape and the first frame energy into a first representation of a first fast Fourier transform, FFT, based spectral analysis and transforming the values of the second spectral shape and the second frame energy into a second representation of a second FFT spectral analysis. The method includes detecting, based on the first representation of the first fast FFT and the second representation of a second FFT, a condition that could lead to suboptimal reconstruction quality of a substitution frame for the lost audio frame when the concealment method is used to create the substitution frame for the lost audio frame. The method includes responsive to detecting the condition, modifying (921) the concealment method by selectively adjusting a spectrum magnitude of a substitution frame spectrum.

The advantage of the techniques in various embodiments described below is that one can avoid using the two short FFTs. This is important as the avoidance directly reduces the complexity of the first lost frame and processing overhead of processing the lost frame. In the first lost frame the complexity is high as it involves both a rather long FFT of the prototype frame and an equally long inverse FFT of the reconstructed spectrum.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
FIG. 1 illustrates a block diagram of using an audio encoder and an audio decoder over a network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The inventive concepts described herein reduce the complexity of the PLC. These embodiments relate to reducing complexity in embodiments where the approach used for packet concealment is sinusoidal modeling in the frequency domain, with an additional low-resolution background noise model to better handle burst errors. In this case, over longer error bursts, the approach proceeds from the sinusoidal model towards the low-resolution noise model. The low-resolution noise model may be updated during the first error frame based on the saved prototype frame. The techniques described may also be used to determine a high quality (and low complexity) frequency band estimate of the energy decay over time for the signal in various frequency bands, which may be used to model the band energies of the concealed frame.

When the speech/audio compression is done in the frequency domain, there may already be spectral representation available in the frequency domain, most often in the modified discrete cosine transform (MDCT) domain. The coefficient of the available spectral representation in many situations can be used to form an alternative spectral shape to replace the complexity of short FFTs. For example, the spectral shapes of the first frame error can be used to create spectral estimates corresponding to those that would have been generated by the short FFTs.

In embodiments described herein, the available MDCT coefficients may be used to provide a spectral shape while the energy (or level) for the spectral estimate is based on the energy of the windowed prototype frame. However, the inventors came to the realization that using the MDCT coefficients alone for both shape and level has been found to provide insufficient quality estimates for the two short FFTs that are to be replaced.

The advantage of the techniques described below is that one can avoid using the two short FFTs. This is important as the avoidance directly reduces the complexity of the first lost frame. In the first lost frame the complexity is high as it involves both a rather long FFT of the prototype frame and an equally long inverse FFT of the reconstructed spectrum.

While the MDCT coefficients available in the decoder do not provide a stable energy estimate, the coefficients can be used for a spectral shape estimation. To get the level for the spectral estimate, the energy of a windowed prototype frame may be used as this may produce a better estimate of the actual FFT spectrum.

Avoiding the complexity of using the two shorter FFTs may result in a slight difference in both temporal characteristics and spectral characteristics. Such differences are of minor importance for the use in the form of a long-term estimate of the background signal, and the slight differences are also not a major issue for the transient detector energy decay estimation.

The inventive concept of the reuse of MDCT coefficients (or any other spectral domain information available in the normal coded domain) and the transformation into a spectral shape that can be used instead of the two short FFT transforms reduces complexity and processing overhead of processing the lost frame. This also involves how the MDCT coefficients are grouped into a format that approximates the FFT bins as close as possible.

Figure 2:
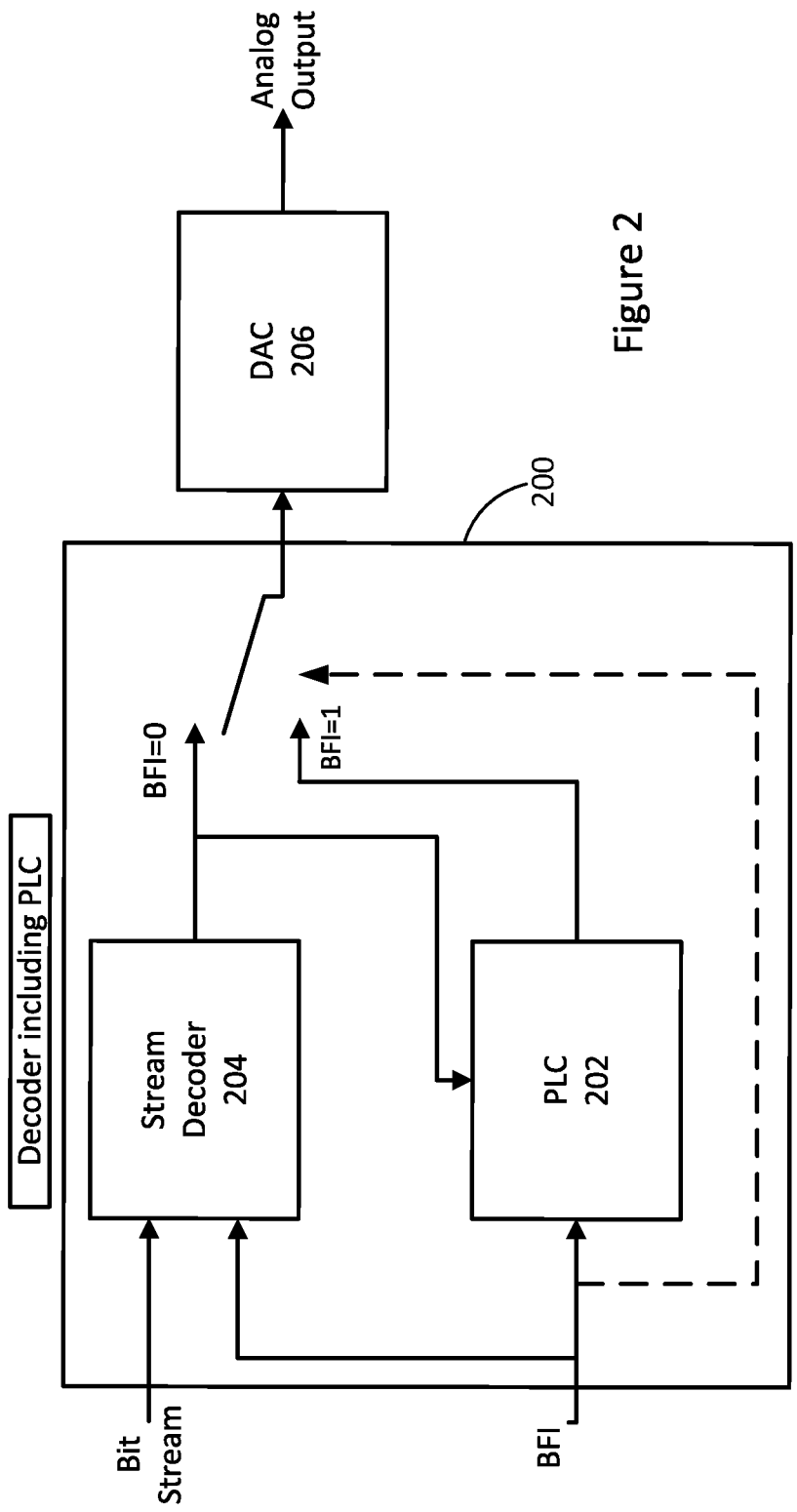
FIG. 2 is a block diagram of a decoder including packet loss concealment
Figure 12:
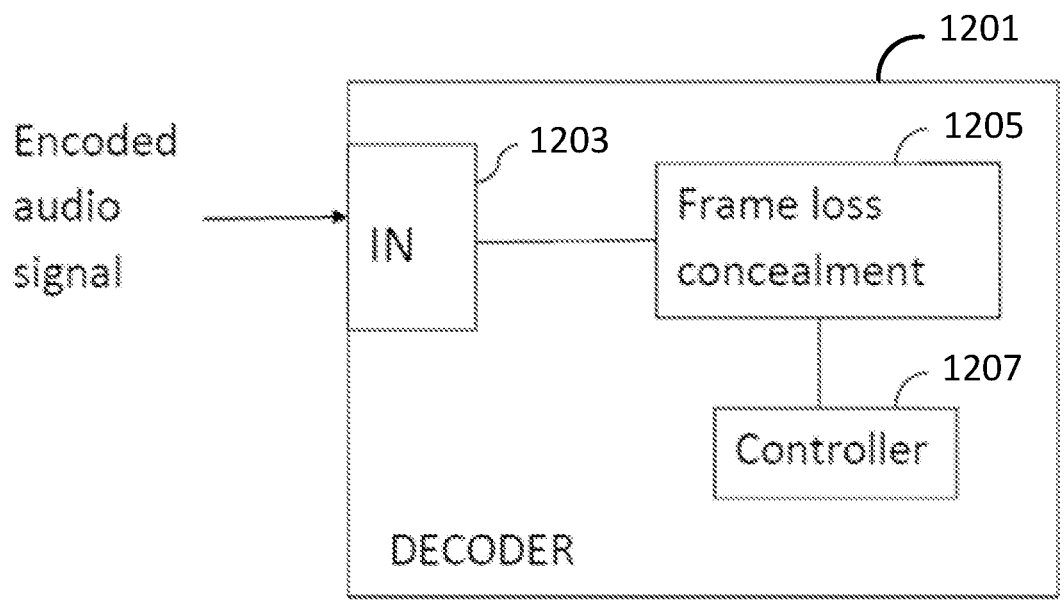
FIG. 12 illustrates an example of a decoder apparatus in accordance with some embodiments of inventive concepts.
Figure 13:
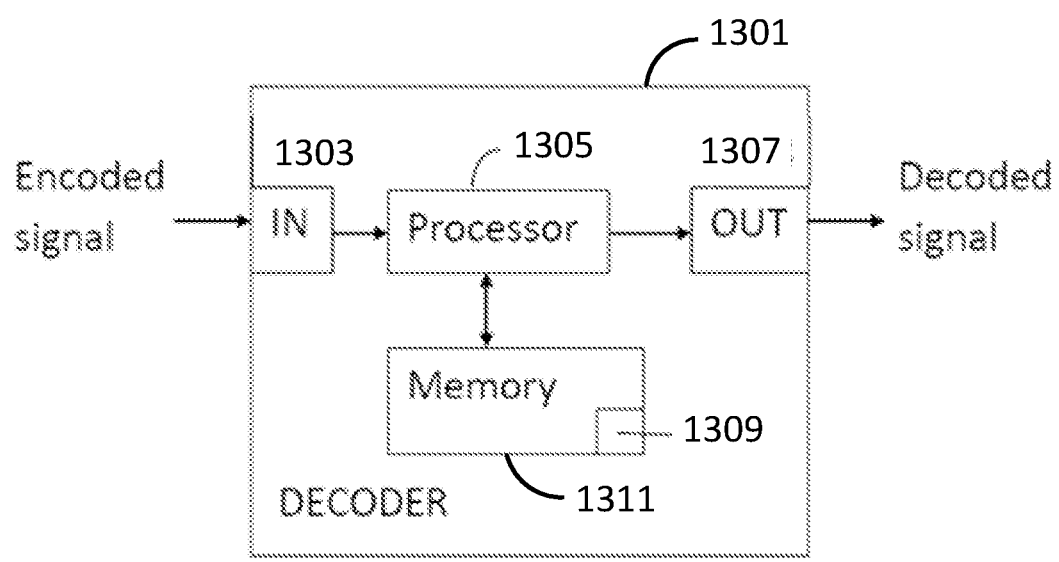
FIG. 13 illustrates another example of a decoder apparatus in accordance with some embodiment of inventive concepts.

The decoder apparatus may consist of two units or may be part of the PLC illustrated in FIG. 2 or the decoder apparatus illustrated in FIG. 12 and FIG. 13. The decoder (1201, 1301) may update the spectral shape and frame energy during error free operation. The decoder (1201, 1301) may use the saved spectral shapes and frame energies during the first frame error to generate the long-term spectral estimate that is to be used during error concealment. A third component of the decoder (1201, 1301) may also be used to determine a frequency band decay to be applied in the PLC reconstruction, such as when there is significant drop in energy.

The reuse of MDCT coefficients typically only generates one spectral shape per frame. Having two spectral shapes during the first error frame may be achieved by generating one spectral shape estimate for each good frame and by also saving the spectral shape estimate from the previous good frame. To obtain the correct level of the spectral estimate, the windowed energy of the corresponding PLC-prototype frame may be saved at the end of the good frame processing in a MDCT based decoder. A good frame means a correctly received error free frame, while a bad frame means an erased, i.e. a lost or corrupted, frame.

During the lost frame, the second unit uses the two saved spectral shapes and frame energies to generate two spectral estimates corresponding to the ones that would have been generated by the two short FFTs. This reduces complexity and processor overhead. Based on the saved shapes and energies, the third unit may establish the decay factors to be used for each frequency band, in the PLC reconstruction of the lost frame. After this the normal processing of the Phase ECU is continued as before, see international patent application no. WO2014123471 (Appendix 1) or 3GPP TS 26.447 V15.0.0 clause 5.4.3.5.

The techniques described herein are not limited to using spectral estimation from MDCT as described above. The techniques can be adapted to work with any other spectral estimation technique that is used in a codec.

The following describes the functions of using the MDCT in more detail.

To obtain the MDCT coefficients, the MDCT is taken over a 20 ms window with a 10 ms advance. When using one transform, e.g. MDCT, to make a sub-band estimate of another transform, e.g. FFT. It is important to make the grouping into sub-bands over the correct coefficients. The PLC prototype frame saved after good frames is 16 ms in length and the transient detector sub band analysis module uses two short FFT of length 4 ms—that is one quarter of the PLC prototype frame. The actual length of these items depends on the sampling frequency used and can be from 8 kHz to 48 kHz. These lengths affect the number of spectral bins in each transform. The two short FFT analysis results are used to determine a conversion factor µ as described below.

Spectral Shape History Update in Good Frames

For the transient analysis, the Phase ECU may use a history of the MDCT based spectral shape and MDCT-synthesis windowed energies to build an image of how the input signal has evolved over time. The spectral shape is calculated based on the decoded MDCT coefficients which holds a spectral representation of the decoded signal. The spectral shape consists of sub-bands where the number of sub-bands, $N_{grp}$, depends on the sampling frequency as seen in Table 1.

TABLE 1

Phase ECU Number of Sub-Bands table

| $f_s$ | $N_{grp}$ |
|---|---|
| 8000 | 4 |
| 16000 | 5 |
| 24000 | 6 |
| 32000 | 7 |
| 44100, 48000 | 8 |

Figure 3:
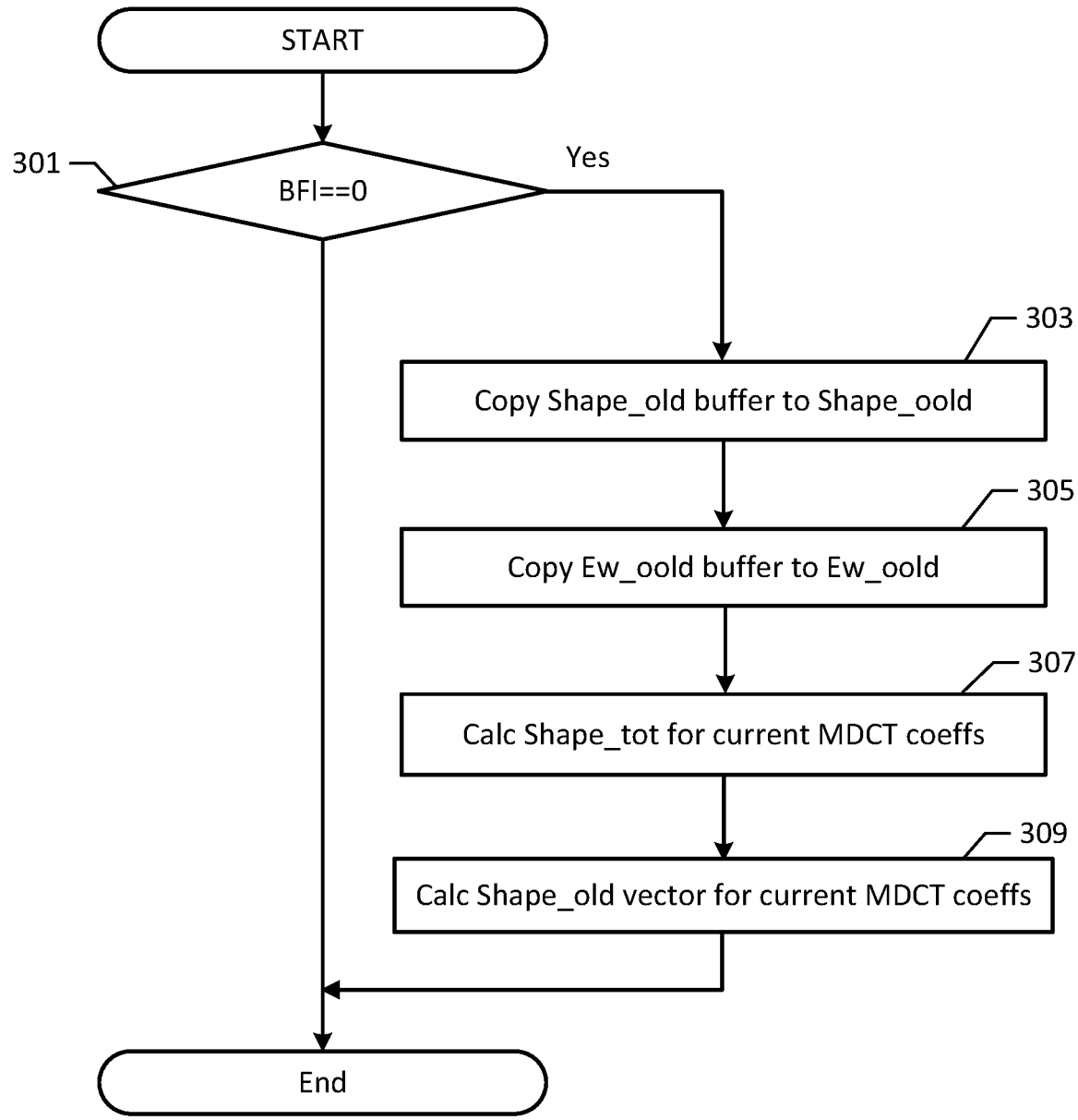
FIG. 3 is a flowchart of operations and methods that can be for updating spectral parameters during good frames in accordance with some embodiments of inventive concepts

For good frames, that is when the bad frame indicator indicates the frame is not a bad frame (e.g., BFI=0), the values of spectral shape and frame energy may be updated. These steps are illustrated in the flowchart in FIG. 3. Turning to FIG. 3, at operation 301, a determination is made as to whether BIF=0. Note that the parameters may only be calculated for the current frame. When the frame before was a good frame, the values saved during the last frame may be moved to the buffers designated as second last frames (i.e., a $shape_{oold}$ buffer(s)). The spectral shape $shape_{old}(k)$ from the last frame are moved and saved in a second buffer $shape_{oold}(k)$ as follows in operation 303:

$$shape_{oold}(k) = shape_{old}(k), 0 \le k < N_{grp}. \quad (1)$$

Similarly, in operation 305, the last frames energy is moved to a second buffer $E\_w_{oold}$ as:

$$E\_w_{oold} = E\_w_{old}. \quad (2)$$

These updates may be followed by calculation of new values of spectral shape $shape_{old}(k)$ and frame energy $E\_w_{old}$ for the last frame buffers in operations 307 and 309. Table 2 illustrates how the bins of the current MDCT coefficients may be divided among the sub-bands. The table entries in Table 2 show start coefficients of each sub-band for an embodiment that may be used in the methods described in international application WO 2014/123471. Other sub-bands may be used for other embodiments.

TABLE 2

Phase ECU MDCT Sub-Bands start bin table

| MDCT_grp_bins (=grp_bin(k)) | {4, 14, 24, 44, 84, 164, 244, 324, 404, 484} |
|---|---|

It may be desirable to have the sub-band based spectral shape in the range [0, . . . 1]. This may be achieved by first calculating the total magnitude of the MDCT coefficients (q_d(n)) as:

$$shape\_tot = \sum_{n=0}^{N_{MDCT}-1} q\_d(n)^2 \quad (3)$$

Where $N_{MDCT}$ is the number of MDCT coefficients and depends on the sampling frequency such as the sampling frequencies illustrated in Table 3.

TABLE 3

Number of MDCT coefficients for different sampling frequencies.

| $f_s$ | $N_{MDCT}$ |
|---|---|
| 8000 | 80 |
| 16000 | 160 |
| 24000 | 240 |
| 32000 | 320 |
| 44100, 48000 | 480 |

The calculated value for shape_tot may then be used to normalize the spectral shape of each sub-band which may be determined as $$shape_{old}(k) = \frac{1}{shape\_tot} \sum_{n=grp\_bin(k)}^{grp\_bin(k+1)-1} q\_d(n)^2, 0 \le k < N_{grp} \quad (4)$$

which forms the spectral shape estimate for the new value of the last frame. Note that there may be some MDCT coefficients that are not assigned to the spectral shape. This is a result of not using the DC bin in the corresponding short FFTs.

To be able to use the spectral shape during reconstruction, the frame energy may be calculated based on the windowed prototype frame. This may be determined as:

$$E\_w_{old} = \sum_{n=0}^{L_{prot}-1} (w_{whr}(n) \cdot x_{prev}(n))^2 \quad (5)$$

where $w_{whr}$ may be (especially for long term background approximation estimation) the long FFT spectral analysis window, $x_{prev}$ is the Phase ECU time domain prototype signal as used to create a substitution for a potentially upcoming lost frame, and $L_{prot}$ is the number of samples in the $x_{prev}$ signal which also corresponds to the length of the time window $w_{whr}$.

In an alternative embodiment, the overall spectral approximation performance may be balanced between providing a good background estimate and a good estimate for transient offset detection. This balancing may be done in an embodiment by optionally altering the applied $w_{whr}$ window to differ from the long/16 ms FFT spectral analysis window. One possible approach to alter this is to shorten the window and shift the energy estimation window towards the future so that the energy estimation is further time aligned with the energy content of the short(4 ms) FFT windows. This approach also reduces the complexity of energy alignment calculations. For example, $E\_w_{old}$ may be reduced to the windowed energy of the 3*L_prot/4(12 ms) most recent synthesized samples, or even the L_prot/2(8 ms) most recent samples. This may balance the spectral approximation between background estimation (targeting the overall spectral period of 16 ms) and transient offset estimation (targeting the last 4 ms)).

Figure 4:
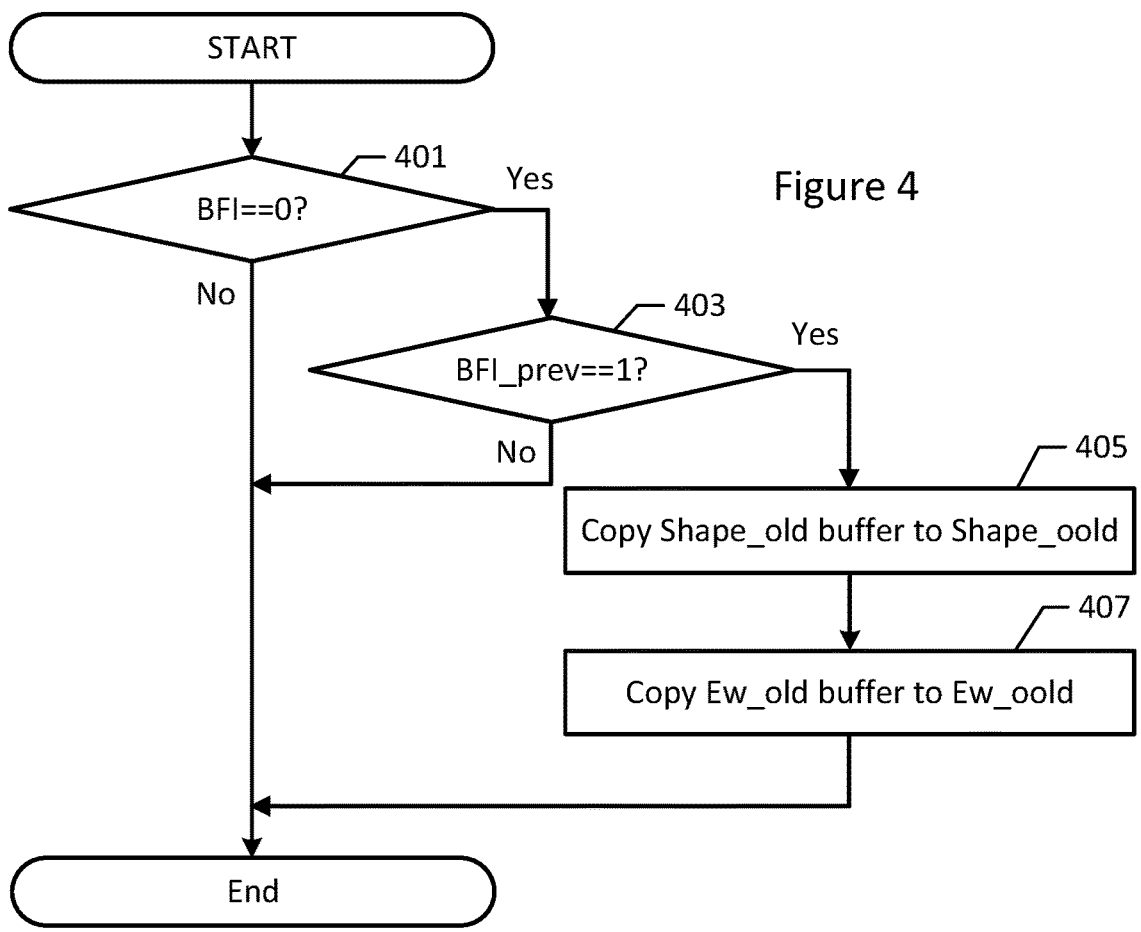
FIG. 4 is a flowchart of operations and methods that can be performed to update spectral parameters during good frames in accordance with some embodiments of inventive concepts.

Turning to FIG. 4, to avoid the use of old values in the secondary buffers after a bad frame or a burst of bad frames, the shape$_{oold}$(k) and $E\_w_{oold}$ states of the spectral shape and frame energy may be re-initialized. Therefore, in the case were a good frame BFI=0 (as illustrated by operation 401) is preceded by a bad frame BFI$_{prev}$=1 (as illustrated by operation 403) the calculated values are copied to the secondary buffers as described in the first equations (1) and (2) respectively in operations 405 and 407.

Conversion of Spectral Shape into Short FFT Sub-Band Energies

The transient analysis may use the saved spectral shape and frame energies to analyze how the sub-band energies are evolving over time. These values may be used for two things, the first is for sub-band transient detector and the second is for forming a long-term average $\overline{E}_{tran}$ that may be used to adjust sub-band energies during burst errors. These values form a basis for calculating signal modification values that are used during error bursts.

TABLE 4

Phase ECU FFT Sub-Bands start bin table

| PhECU_grp_bins (start bins, indexing starts from 0) | {1, 3, 5, 9, 17, 33, 49, 65, 81, 97} |
|---|---|

Figure 5:
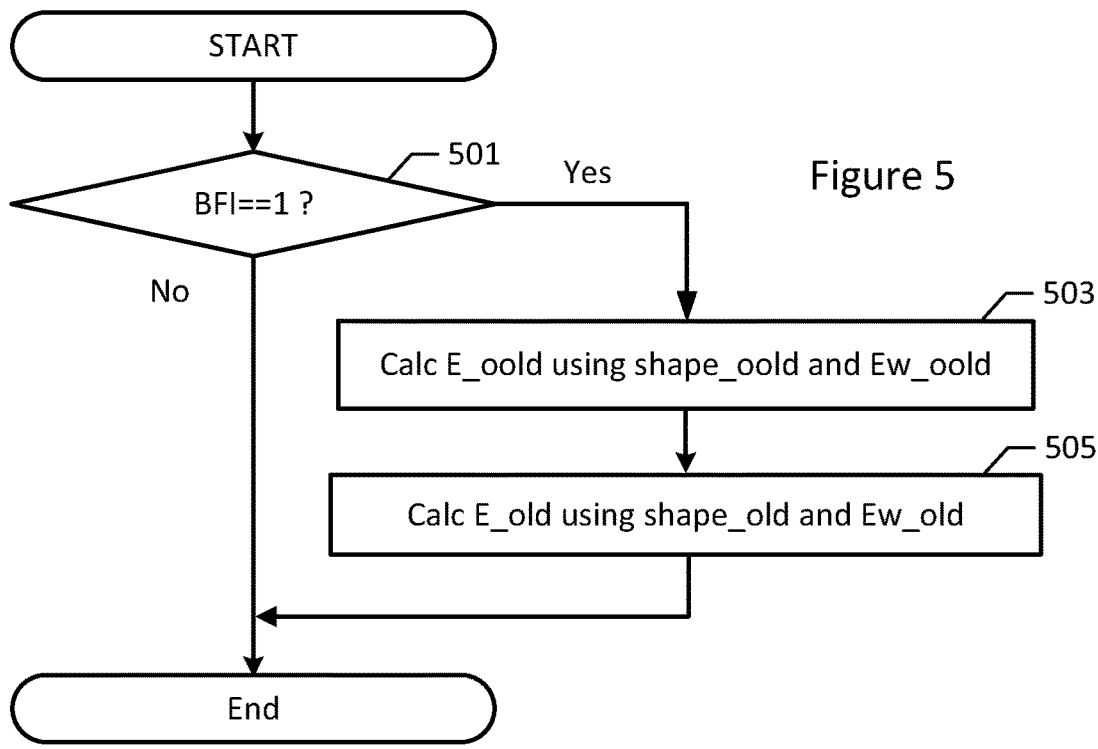
FIG. 5 is a flowchart for updating spectral parameters during bad frames in accordance with some embodiments of inventive concepts.

The spectral shapes and frame energies are used to generate the approximations of sub-band energies for the two last error free frames. This is illustrated in the flow chart of FIG. 5 when the bad frame indicator indicates a bad frame (i.e. BFI=1) at operation 501. Turning to FIG. 5, the first frame represents the sub-band frame energies before the last frame and may be generated in operation 503 by:

$$E_{oold}(k) = \mu \cdot \text{shape}_{oold}(k) \cdot E\_w_{oold}, \quad 0 \le k < N_{grp} \quad (6)$$

The second sub-frame frame energies are for the last frame and may be generated in operation 505 by:

$$E_{old}(k) = \mu \cdot \text{shape}_{old}(k) \cdot E_{w_{old}}, \quad 0 \le k < N_{grp} \quad (7)$$

where μ is a scalar constant that depends on the sampling frequency and handles the conversion of the MDCT based spectral shape to an approximation of an FFT based spectral analysis, $\overline{E}_{tran}$. An example of μ for various $f_s$ frequencies is shown in Table 5.

TABLE 5

Phase ECU MDCT to FFT spectral shape conversion factor μ table

| $f_s$ | μ |
|---|---|
| 8000 | 1.9906 |
| 16000 | 4.0445 |
| 24000 | 6.0980 |
| 32000 | 8.1533 |
| 44100, 48000 | 12.2603 |

The conversion factor μ may be calculated off-line and depends on the MDCT-window and the window used in the FFT for which it serves as an approximation for during lost frame reconstruction. To find these coefficients, the PLC should be run with both methods (original FFT analysis and the reduced complexity approximation of the FFT using the MDCT) active to calculate the conversion factor(s). A convenient method for calculating the conversion factor is to use sine waves. One wave may be used in the center of each group interval and the calculation may be started with the coefficient set to one. The correct value may be calculated by comparing the two methods. Note that the bins in Table 4 show the bin grouping for an FFT with an analysis length that is a quarter of the one used for the spectral analysis used by the PLC on the prototype frame, i.e. if the spectral analysis is made using a 16 ms FFT, the bin grouping is for a 4 ms spectral analysis.

Figure 6:
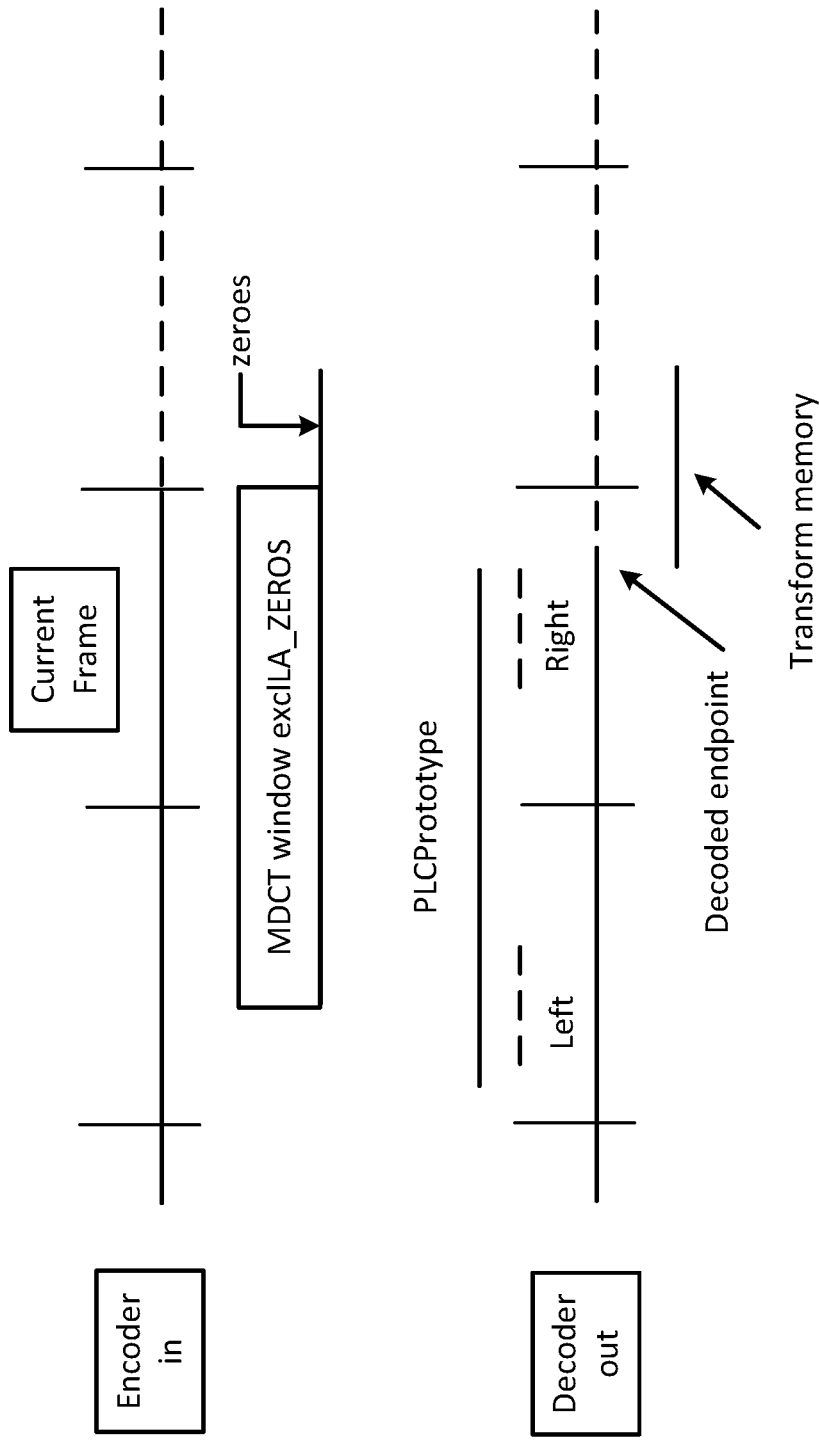
FIG. 6 is a signal diagram of a PLC Prototype buffer and the location of the short FFT's for transient detection if the next frame would be lost.

FIG. 6 illustrates an overview of how the framing and the related Frame structure of the MDCT coder is applied for an asymmetrically located MDCT window and with a segment of look ahead zeros—LA_ZEROS. Note that the signal diagram shows that a frame is only decoded up to a point of ¾ of the current frame due to the use of look ahead zeros (LA_ZEROS—⅜ of the frame length) in the MDCT window. The framing affects which part of the current frame is possible to decode and therefore affects the position of the PLC prototype frame that is saved and used in case the next frame is lost.

FIG. 6 also illustrates the difference in length of the involved transforms used in the embodiment. Even in MDCT with a length twice the length of the encoded frame each spectral point is represented with two coefficients (compare with FFT where an N sample results in N complex numbers—that is 2 N scalar values) where one may be a time reversal of the other.

Figure 7:
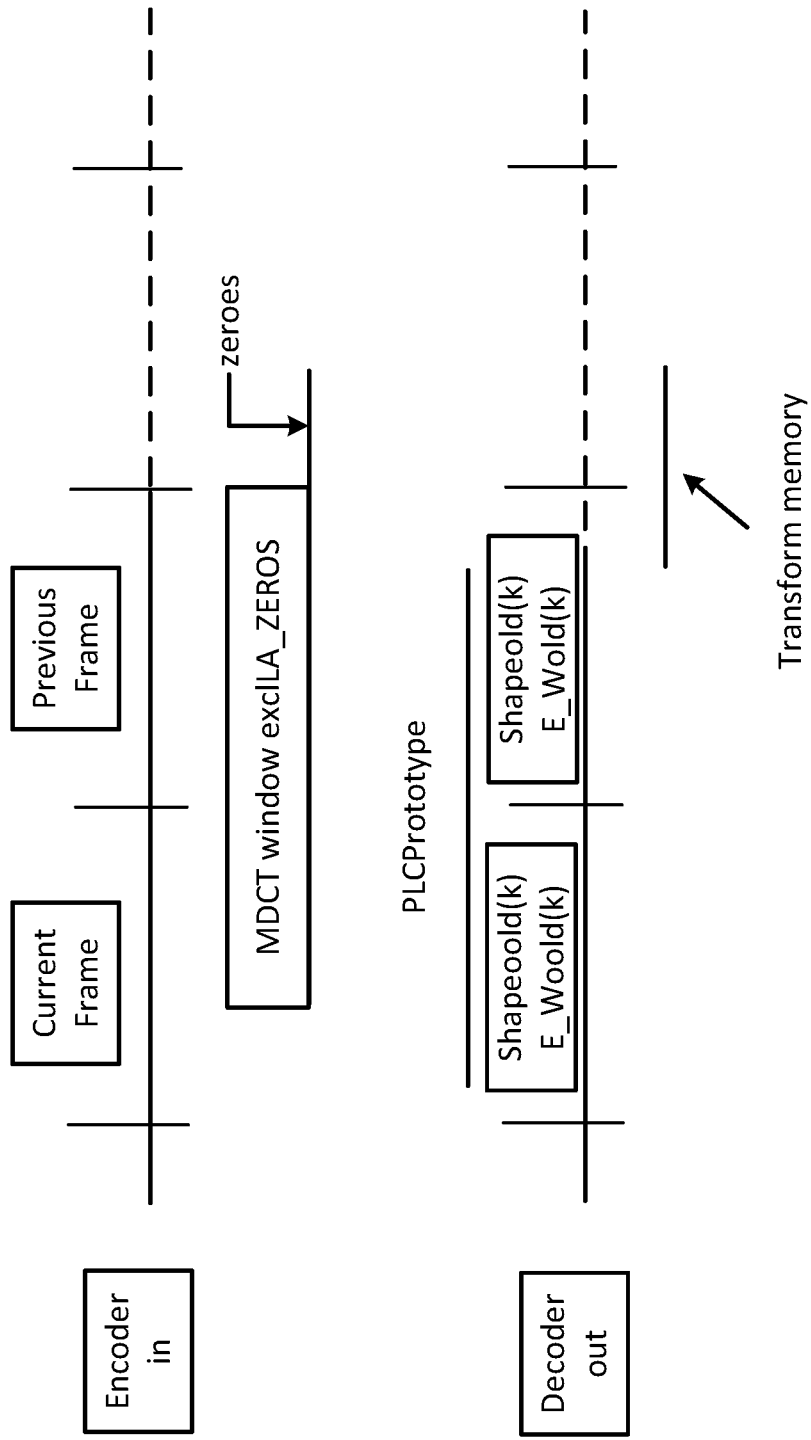
FIG. 7 is a signal diagram of a PLC Prototype buffer and the location of the spectral shape and frame energies for transient detection if the next frame would be lost in accordance with some embodiments.

FIG. 7 illustrates an overview of how the framing and the related frame structure of the MDCT coder is applied to determine the sub-band energies and the spectral shapes as described above. FIG. 7 illustrates the current frame and the previous frame being good frames and shows where in relation to the coding process the method of FIGS. 3 and 9-11 may be performed.

Figure 8:
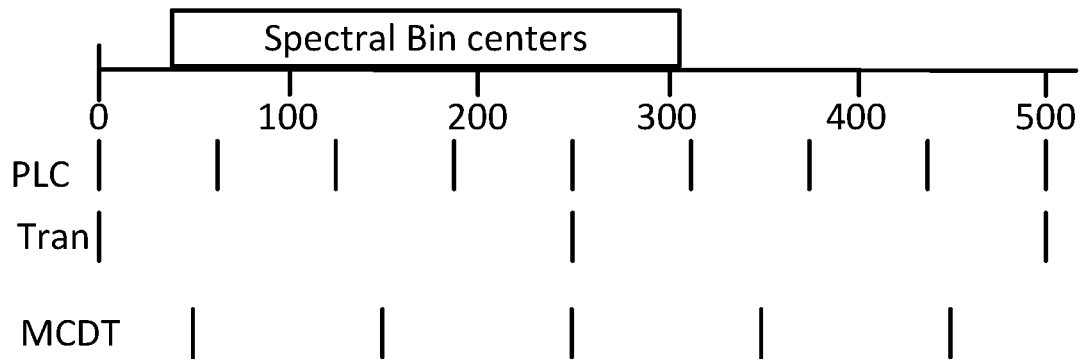
FIG. 8 is a diagram illustrating the difference in frequency resolution and the bin center points for the different PLC related transforms.

FIG. 8 illustrates a graphical representation of the different spectral representations. The PLC spectral analysis is made on a 16 ms time segment—this results in a inter bin distance of 62.5 Hz. From a N point FFT one gets N/2+1 bins where the start point is 0 Hz and the last is fs/2 (half the sampling frequency). The same applies for the transient analysis where the short FFTs that are to be replaced—the difference is that the time window is 4 ms—this results in inter bin distance of 250 Hz. For the MDCT which is made over a 20 ms time segment—the inter bin distance becomes 100 Hz after grouping the time and time reversed coefficients for M MDCT and length of M MDCT there are M/4 coefficients after grouping. The MDCT does not have a DC or fs/2 coefficients, so the simplest representation is to have a half bin offset as shown in FIG. 8.

In an embodiment, these estimates of the spectral estimates for the transient analysis as described above may be used to replace the spectral estimates used in the transient calculation and concealment adaptation as described in international patent application no. WO2014123471 (see Appendix 1). These estimates may also be used in other situations where spectral estimates are used such as in 3GPP TS 25.447 V. 15.0.0.

Figure 9:
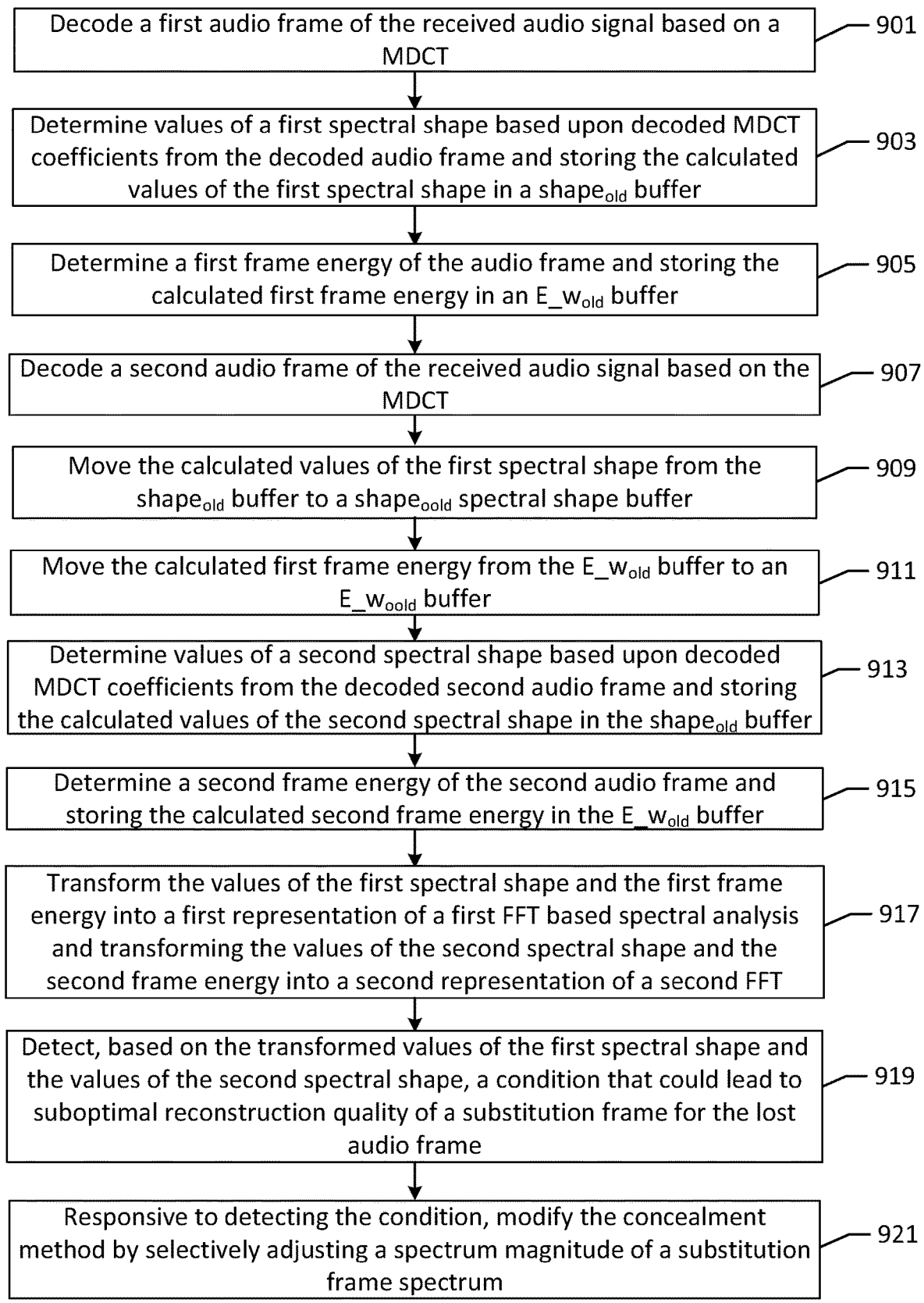
FIG. 9 is a flowchart illustrating modifying a concealment method in accordance with some embodiments of inventive concepts.

For example, turning to FIG. 9, a decoder (1201, 1301) may decode a first audio frame of a received audio signal based on a MDCT in operation 901. In operation 903, the decoder (1201, 1301) may determine values of a first spectral shape based upon MDCT coefficients from the decoded first audio frame and store the determined values of the first spectral shape in a shape$_{old}$ buffer, the first spectral shape comprising a number of sub-bands. In operation 905, the decoder (1201, 1301) may determine a first frame energy of the first audio frame and store the determined first frame energy in an E_w$_{old}$ buffer.

In operation 907, the decoder (1201, 1301) may decode a second audio frame of the received audio signal based on the MDCT. In operation 909, the decoder (1201, 1301) may move the determined values of the first spectral shape from the shape$_{old}$ buffer to a shape$_{oold}$ buffer. Operation 909 may correspond to operation 303 of FIG. 3. In operation 911, the decoder (1201, 1301) may move the determined first frame energy from the E_w$_{old}$ buffer to an E_w$_{oold}$ buffer. Operation 911 may correspond to operation 305 of FIG. 3.

In operation 913, the decoder (1201, 1301) may determine values of a second spectral shape based upon decoded MDCT coefficients from the decoded second audio frame and store the determined values of the second spectral shape in the shape$_{old}$ buffer, the second spectral shape comprising the number of sub-bands. In operation 915, the decoder (1201, 1301) may determine a second frame energy of the second audio frame and store the calculated second frame energy in the E_w$_{old}$ buffer.

In operation 917, the decoder (1201, 1301) may transform the values of the first spectral shape and the first frame energy into a first representation of a first fast Fourier transform, FFT, based spectral analysis and transform the values of the second spectral shape and the second frame energy into a second representation of a second FFT spectral analysis.

In operation 919, the decoder (1201, 1301) may detect, based on the transformed values of the first spectral shape and the values of the second spectral shape, a condition that could lead to suboptimal reconstruction quality of a substitution frame for the lost audio frame when the concealment method is used to create the substitution frame.

In operation 921, the decoder (1201, 1301), responsive to detecting the condition, may modify the concealment method by selectively adjusting a spectrum magnitude of a substitution frame spectrum.

In one embodiment, the spectral estimates describe above may be used to reduce the complexity and processing overhead in the transient calculation and concealment adaptation such as described in international patent application no. WO2014123471 and 3GPP TS 25.447 V. 15.0.0 clause 5.4.3.5. The E$_{oold}$(k) and E$_{old}$(k) are used to calculate an energy ratio estimate and transient detection may be done using the bins of E$_{oold}$(k) and E$_{old}$(k). For example, turning to FIG. 10, in operation 1001, the sub-band energies of E$_{oold}$(k) and E$_{old}$(k) may be determined as described above. The frequency group selective transient detection can now be based on the band-wise ratio between the respective band energies of the frames associated with E$_{oold}$(k) and E$_{old}$(k):

$$R_{old \backslash oold, band}(k) = \frac{E_{old}(k)}{E_{oold}(k)}$$

Other ratios may be used.

It is to be noted that the interval $l_k=[m_{k-1}+1, \ldots, m_k]$ corresponds to the frequency band $$B_k = \left[ \frac{m_{k-1}+1}{N_{part}} \cdot f_s, \ldots, \frac{m_k}{N_{part}} \cdot f_s \right],$$

where $f_s$ denotes the audio sampling frequency, and $N_{part}$ corresponds to the size of the frame. The lowest lower frequency band boundary $m_0$ can be set to 0 but may also be set to a DFT index corresponding to a larger frequency in order to mitigate estimation errors that grow with lower frequencies. The highest upper frequency band boundary $m_K$ can be set to $$\frac{N_{part}}{2}$$

but is preferably chosen to correspond to some lower frequency in which a transient still has a significant audible effect.

The ratios may be compared to certain thresholds. For example, a respective upper threshold for (frequency selective) onset detection 1003 and a respective lower threshold for (frequency selective) offset detection 1005 may be used. When the energy ratio is above the upper threshold or below the lower threshold, the concealment method may be modified in operation 1007. These operations correspond to operation 919 of FIG. 9.

Figure 11:
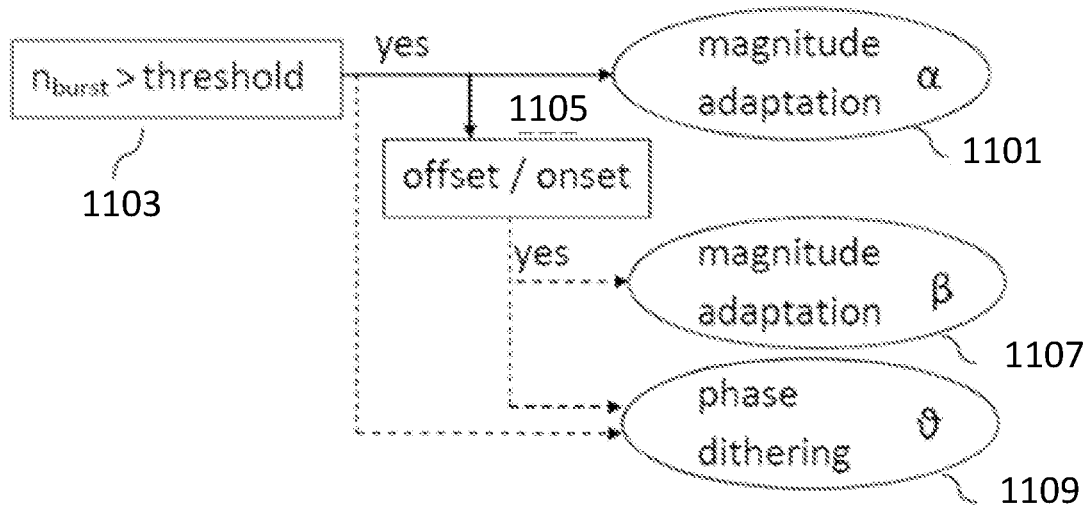
FIG. 11 is a flowchart illustrating modifying a concealment method in accordance with some embodiments of inventive concepts.

An example of modifying the concealment method of operation 921 of FIG. 9 is illustrated in FIG. 11. In this embodiment of concealment method modification, the magnitude and phase of a substitution frame spectrum is determined. The magnitude is modified by means of scaling with two factors $\alpha(m)$ and $\beta(m)$ and the phase is modified with an additive phase component $\vartheta(m)$. This leads to the calculation of the substitution frame:

$$Z(m)=\alpha(m)\cdot\beta(m)\cdot Y(m)\cdot e^{j(\theta_k+\vartheta(m))}$$

where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

In this embodiment, the number $n_{burst}$ of observed frame losses in a row is determined where a burst loss counter is incremented with one upon each frame loss and reset to zero upon the reception of a valid frame. Magnitude adaptation, in operation 1101, is preferably done if the burst loss counter $n_{burst}$ exceeds some threshold $thr_{burst}$, e.g. $thr_{burst}=3$ as determined in operation 1103. In that case a value smaller than 1 is used for the attenuation factor, e.g. $\alpha(m)=0.1$. A further adaptation with regards to the magnitude attenuation factor may be done in case a transient has been detected based on that the indicator $R_{old\backslash oold,band}(k)$ or alternatively $R_{old\backslash oold}(m)$ or $R_{old\backslash oold}$ have passed a threshold as determined in operation 1105. In that case a suitable adaptation action in operation 1107 is to modify the second magnitude attenuation factor β(m) such that the total attenuation is controlled by the product of the two factors α(m)·β(m).

β(m) may be set in response to an indicated transient. In case an offset is detected the factor β(m) may be chosen to reflect the energy decrease of the offset. A suitable choice is to set β(m) to the detected gain change:

$$\beta(m) = \sqrt{R_{old\backslash oold, band}(k)} \text{ for } m \in l_k, k=1 \ldots K$$

In case an onset is detected it is rather found advantageous to limit the energy increase in the substitution frame. In that case the factor can be set to some fixed value of e.g. 1, meaning that there is no attenuation but not any amplification either.

Examples of the phase dithering in operation 1109 are in international patent application no. WO2014123471 (see Appendix 1) and in 3GPP_TS_26.447_v.15.0.0_2018_06, clause 5.4.3.5.3 and need not be described herein in detail.

FIG. 12 is a schematic block diagram of a decoder that may be used according to the embodiments. The decoder 1201 comprises an input unit 1203 configured to receive an encoded audio signal. FIG. 11 illustrates the frame loss concealment by a logical frame loss concealment-unit 1205, which indicates that the decoder is configured to implement a concealment of a lost audio frame, according to the above-described embodiments. Further the decoder comprises a controller 1207 for implementing the embodiments described above, including the operations illustrated in FIGS. 3-5 and 9-11, and/or operations discussed below with respect to respective Example Embodiments.

For example, the controller 1207 may be configured to determine properties of the previously received and reconstructed audio signal or in the statistical properties of the observed frame losses for which the substitution of a lost frame according to the original, non-adapted Phase ECU method provide relatively reduced quality. In case such a condition is detected, the controller 1207 may be configured to modify the element of the concealment methods according to which the substitution frame spectrum is calculated by selectively adjusting the phases or the spectrum magnitudes as described above and output the audio frame towards a receiver for playback. The receiver may be a device having a loudspeaker, a loudspeaker device, a phone, etc.

The decoder may be implemented in hardware. There are numerous variants of circuitry elements that can be used and combined to achieve the functions of the units of the decoder. Such variants are encompassed by the embodiments. Particular examples of hardware implementation of the decoder is implementation in digital signal processor (DSP) hardware and integrated circuit technology, including both general-purpose electronic circuitry and application-specific circuitry.

The decoder described herein could alternatively be implemented e.g. as illustrated in FIG. 13, i.e. by one or more of a processor 1305 and adequate software 1309 with suitable storage or memory 1311 therefore, in order to reconstruct the audio signal, which includes performing audio frame loss concealment according to the embodiments described herein, as shown in FIGS. 3-5 and 9-11. The incoming encoded audio signal is received by an input (IN) 1303, to which the processor 1305 and the memory 1311 are connected. The decoded and reconstructed audio signal obtained from the software is outputted from the output (OUT) 1307 towards a receiver for playback. As discussed herein, operations of the decoder 1301 may be performed by processor 1305. Moreover, modules may be stored in memory 1311, and these modules may provide instructions so that when instructions of a module are executed by processor 1305, processor 1305 performs respective operations.

The technology described above may be used e.g. in a receiver, which can be used in a mobile device (e.g. mobile phone, laptop) or a stationary device, such as a personal computer.

It is to be understood that the choice of interacting units or modules, as well as the naming of the units are only for exemplary purpose, and may be configured in a plurality of alternative ways in order to be able to execute the disclosed process actions.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
|---|---|
| ADC | Analog to Digital Converter |
| BFI | Bad Frame Indicator |
| BFI_prev | Bad Frame Indicator of previous frame |
| DAC | Digital to Analog Converter |
| FFT | Fast Fourier Transform |
| MDCT | Modified Discrete Cosine Transform |

REFERENCES

[1] International patent application no. WO2014123470
[2] International patent application no. WO2014123471
[3] 3GPP TS 26.445 V15.1.0 (clauses 5.3.2.2 and 6.2.4.1), hereby incorporated by reference in its entirety
[4] 3GPP TS 26.447 V15.0.0 (clause 5.4.3.5), hereby incorporated by reference in its entirety

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

1. A method by a computer processor for controlling a concealment method for a lost audio frame of a received audio signal, the method comprising:
    decoding (901) a first audio frame of the received audio signal based on a modified discrete cosine transform, MDCT;
    determining (307-309, 903) values of a first spectral shape based upon decoded MDCT coefficients from the decoded audio frame and storing the calculated values of the first spectral shape in a shape$_{old}$ buffer, the first spectral shape comprising a number of sub-bands;
    determining (905) a first frame energy of the audio frame and storing the calculated first frame energy in an E_w$_{old}$ buffer;
    decoding (907) a second audio frame of the received audio signal;
    moving (303, 909) the calculated values of the first spectral shape from the shape$_{old}$ buffer to a shape$_{oold}$ buffer;

moving (305, 911) the calculated first frame energy from the $E\_w_{old}$ buffer to an $E\_w_{oold}$ buffer;

determining (307-309, 913) values of a second spectral shape based upon decoded MDCT coefficients from the decoded second audio frame and storing the calculated values of the second spectral shape in the $shape_{old}$ buffer the second spectral shape comprising the number of sub-bands;

determining (915) a second frame energy of the second audio frame and storing the calculated second frame energy in the $E\_w_{old}$ buffer;

transforming (917) the values of the first spectral shape and the first frame energy into a first representation of a first fast Fourier transform, FFT, based spectral analysis and transforming (917) the values of the second spectral shape and the second frame energy into a second representation of a second FFT spectral analysis;

detecting (919), based on the first representation of the first fast FFT and the second representation of a second FFT, a condition that could lead to suboptimal reconstruction quality of a substitution frame for the lost audio frame when the concealment method is used to create the substitution frame for the lost audio frame; and responsive to detecting the condition, modifying (921) the concealment method by selectively adjusting a spectrum magnitude of a substitution frame spectrum.

2. The method of Embodiment 1 wherein determining the values of the first spectral shape based upon decoded MDCT coefficients comprises:

determining (307) a total magnitude of the MDCT coefficients;

normalizing each sub-band value of the first spectral shape; and storing each normalized sub-band value as a value of the values of the first spectral shape.

3. The method of Embodiment 2 wherein the total magnitude of the MDCT coefficients is determined in accordance with $$shape\_tot = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and $q\_d(n)$ are the MDCT coefficients 4. The method of any of Embodiments 2-3 where the normalizing of each sub-band is normalized in accordance with $$shape_{old}(k) = \frac{1}{shape\_tot} \sum_{n=grp\_bin(k)}^{grp\_bin(k+1)-1} q\_d(n)^2,$$

$$0 \le k < N_{grp}$$

where $shape_{old}(k)$ is a spectral shape of a sub-band (k), shape_tot is the total magnitude of the MDCT coefficients, $q\_d(n)$ are the MDCT coefficients, and $N_{grp}$ is a number of the MDCT coefficients, grp_bin(k) is a start index for the MDCT coefficients in sub-band(k), and $N_{grp}$ is the number sub-bands.

5. The method of any of Embodiments 1-4 wherein frame energy of the first frame energy and the second frame energy is determined in accordance with $$E\_w_{old} = \sum_{n=0}^{L_{prot}-1} (w_{whr}(n) \cdot x_{prev}(n))^2$$

where $E\_w_{old}$ is the frame energy, $w_{whr}$ is along FFT spectral analysis window, $x_{prev}$ is a time domain prototype signal used to create a substitution for a potentially upcoming lost frame, and $L_{prot}$ is a number of samples in the $x_{prev}$ signal 6. The method of any of Embodiments 1-5, wherein transforming the values of the first spectral shape and the first frame energy into the first representation of a first fast FFT based spectral analysis and transforming the values of the second spectral shape and the second frame energy into a second representation of a second FFT spectral analysis comprises applying a conversion factor to the values of the first spectral shape and the first frame energy and to the values of the second spectral shape and the second frame energy.

7. The method of Embodiment 6 wherein the conversion factor depends on a sampling frequency of the decoding.

8. The method of any of Embodiments 4-7, further comprising:

transforming the values of the first spectral shape and the first frame energy into the first representation of a first fast FFT based spectral analysis and transforming the values of the second spectral shape and the second frame energy into a second representation of a second FFT spectral analysis in accordance with $$E_{oold}(k) = \mu \cdot shape_{oold}(k) \cdot E\_w_{oold}, \quad 0 \le k < N_{grp}$$

and $$E_{old}(k) = \mu \cdot shape_{old}(k) \cdot E_{w_{old}}, \quad 0 \le k < N_{grp}$$

where $E_{oold}(k)$ is the first representation, $\mu$ is the conversion factor, $shape_{oold}(k)$ is a spectral shape of a sub-band (k) of the first spectral shape, $E\_w_{oold}$ is the first frame energy, $E_{old}(k)$ is the second representation, $shape_{old}(k)$ is a spectral shape of a sub-band (k) f the second spectral shape, $E\_w_{old}$ is the second frame energy, and $N_{grp}$ is the number of sub-bands.

9. The method of Embodiment 8 further comprising:

determining (1105) if a sub-band transient is above a threshold value based on $E_{oold}(k)$ and $E_{old}(k)$;

responsive to a sub-band transient being above the threshold value, modifying the concealment method by selectively adjusting (1107) the spectrum magnitude of the substitution frame spectrum.

10. The method of Embodiment 9 wherein the substitution frame spectrum is calculated according to an expression of $$Z(m) = \alpha(m) \cdot \beta(m) \sim Y(m) \cdot e^{j(\theta_k + \vartheta(m))}$$

and adjusting the spectrum magnitude comprises adjusting $\beta(m)$ (1107), where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

11. The method of any of Embodiments 1-10 further comprising:
    receiving a bad frame indicator (403, 501);
    responsive to receiving the bad frame indicator, flushing the shape$_{oold}$ buffer and the E_w$_{oold}$ energy buffer;
    receiving a new audio frame of the received audio signal;
    determining values of a new spectral shape (503) based upon decoded MDCT coefficients from the decoded new audio frame and storing the calculated values of the new spectral shape in the shape$_{old}$ buffer and the shape$_{oold}$ buffer (405), the new spectral shape comprising a number of sub-bands; and
    determining a new frame energy (505) of the audio frame and storing the calculated new frame energy in the E_w$_{old}$ buffer and the E_w$_{oold}$ buffer (407).

12. A decoder apparatus (1201, 1301) adapted to perform operations according to any of Embodiments 1-11.

13. A decoder apparatus (1201, 1301) configured to control a concealment method for a lost audio frame of a received audio signal, the decoder apparatus configured to:
    decode a first audio frame of the received audio signal based on a modified discrete cosine transform, MDCT;
    determine values of a first spectral shape based upon decoded MDCT coefficients from the decoded audio frame and store the calculated values of the first spectral shape in a shape$_{old}$ buffer, the first spectral shape comprising a number of sub-bands;
    determine a first frame energy of the audio frame and store the calculated first frame energy in an E_w$_{old}$ buffer;
    decode a second audio frame of the received audio signal;
    move the calculated values of the first spectral shape from the shape$_{old}$ buffer to a shape$_{oold}$ buffer;
    move the calculated first frame energy from the E_w$_{old}$ buffer to a E_w$_{oold}$ buffer;
    determine values of a second spectral shape based upon decoded MDCT coefficients from the decoded second audio frame and store the calculated values of the second spectral shape in the shape$_{old}$ buffer the second spectral shape comprising the number of sub-bands;
    determining a second frame energy of the second audio frame and storing the calculated second frame energy in the E_w$_{old}$ buffer;
    transform the values of the first spectral shape and the first frame energy into a first representation of a first fast Fourier transform, FFT, based spectral analysis and transform the values of the second spectral shape and the second frame energy into a second representation of a second FFT spectral analysis;
    detect, based on the first representation of the first fast FFT and the second representation of a second FFT, a condition that could lead to suboptimal reconstruction quality of a substitution frame for the lost audio frame when the concealment method is used to create the substitution frame for the lost audio frame; and
    responsive to detecting the condition, modify the concealment method by selectively adjusting a spectrum magnitude of a substitution frame spectrum.

14. The decoder apparatus of Embodiment 13, wherein the decoder apparatus is configured to perform the operations of Embodiments 2-11.

15. A decoder apparatus (1201, 1301) configured to control a concealment method for a lost audio frame of a received audio signal, the decoder apparatus comprising:
    a processor (1305); and
    a memory (1311) storing instructions that, when executed by the processor, cause the decoder apparatus (1201, 1301) to perform operations comprising:
        decoding (901) a first audio frame of the received audio signal based on a modified discrete cosine transform, MDCT;
        determining (903) values of a first spectral shape based upon decoded MDCT coefficients from the decoded audio frame and storing the calculated values of the first spectral shape in a shape$_{old}$ buffer, the first spectral shape comprising a number of sub-bands;
        determining (905) a first frame energy of the audio frame and storing the calculated first frame energy in an E_w$_{old}$ buffer;
        decoding (907) a second audio frame of the received audio signal;
        moving (303, 909) the calculated values of the first spectral shape from the shape$_{old}$ buffer to a shape$_{oold}$ buffer;
        moving (305, 911) the calculated first frame energy from the E_w$_{old}$ buffer to a E_w$_{oold}$ buffer;
        determining (307-309, 913) values of a second spectral shape based upon decoded MDCT coefficients from the decoded second audio frame and storing the calculated values of the second spectral shape in the shape$_{old}$ buffer the second spectral shape comprising the number of sub-bands;
        determining (915) a second frame energy of the second audio frame and storing the calculated second frame energy in the E_w$_{old}$ buffer;
        transforming (917) the values of the first spectral shape and the first frame energy into a first representation of a first fast Fourier transform, FFT, based spectral analysis and transforming the values of the second spectral shape and the second frame energy into a second representation of a second FFT spectral analysis;
        detecting (919), based on the first representation of the first fast FFT and the second representation of a second FFT, a condition that could lead to suboptimal reconstruction quality of a substitution frame for the lost audio frame when the concealment method is used to create the substitution frame for the lost audio frame; and
        responsive to detecting the condition, modifying (921) the concealment method by selectively adjusting a spectrum magnitude of a substitution frame spectrum.

16. The decoder apparatus of Embodiment 1 wherein to determine the values of the first spectral shape based upon decoded MDCT coefficients, the instructions comprise further instructions that, when executed by the processor, cause the apparatus to perform operations comprising:
    determining (307) a total magnitude of the MDCT coefficients;
    normalizing each sub-band value of the first spectral shape; and storing each normalized sub-band value as a value of the values of the first spectral shape.

17. The decoder apparatus of Embodiment 16 wherein the total magnitude of the MDCT coefficients is determined in accordance with $$\text{shape\_tot} = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and $q\_d(n)$ are the MDCT coefficients.

18. The decoder apparatus of any of Embodiments 16-17 where the normalizing of each sub-band is normalized in accordance with $$shape_{old}(k) = \frac{1}{\text{shape\_tot}} \sum_{n=grp\_bin(k)}^{grp\_bin(k+1)-1} q\_d(n)^2, \ 0 \le k < N_{grp}$$

where $shape_{old}(k)$ is a spectral shape of a sub-band (k), shape_tot is the total magnitude of the MDCT coefficients, $q\_d(n)$ are the MDCT coefficients, grp_bin (k) is a start index for the MDCT coefficients in sub-band(k), and $N_{grp}$ is the number of sub-bands.

19. The decoder apparatus of any of Embodiments 15-18 wherein frame energy of the first frame energy and the second frame energy is determined in accordance with $$E\_w_{old} = \sum_{n=0}^{L_{prot}-1} (w_{whr}(n) \cdot x_{prev}(n))^2$$

where $E\_w_{old}$ is the frame energy, $w_{whr}$ is along FFT spectral analysis window, $x_{prev}$ is a time domain prototype signal used to create a substitution for a potentially upcoming lost frame, and $L_{prot}$ is a number of samples in the $x_{prev}$ signal.

20. The decoder apparatus of any of Embodiments 15-19 wherein to transform the values of the first spectral shape and the first frame energy into the first representation of a first fast FFT based spectral analysis and to transform the values of the second spectral shape and the second frame energy into a second representation of a second FFT spectral analysis, the instructions comprise further instructions that, when executed by the processor, cause the apparatus to perform operations comprising:
applying a conversion factor to the values of the first spectral shape and the first frame energy and to the values of the second spectral shape and the second frame energy.

21. The decoder apparatus of Embodiment 20 wherein the conversion factor depends on a sampling frequency of the decoding.

22. The decoder apparatus of any of Embodiments 20-21, further comprising:
transforming the values of the first spectral shape and the first frame energy into the first representation of a first fast FFT based spectral analysis and transforming the values of the second spectral shape and the second frame energy into a second representation of a second FFT spectral analysis in accordance with $$E_{oold}(k) = \mu \cdot shape_{oold}(k) \cdot E\_w_{oold}, \ 0 \le k < N_{grp}$$

and $$E_{old}(k) = \mu \cdot shape_{old}(k) \cdot E_{w_{old}}, \ 0 \le k < N_{grp}$$

where $E_{oold}(k)$ is the first representation, μ is the conversion factor, $shape_{oold}(k)$ is a spectral shape of a sub-band (k) of the first spectral shape, $E\_w_{oold}$ is the first frame energy, $E_{old}(k)$ is the second representation, $shape_{old}(k)$ is a spectral shape of a sub-band (k) f the second spectral shape, $E\_w_{old}$ is the second frame energy, and $N_{grp}$ is the number of sub-bands.

23. The decoder apparatus of Embodiment 22 wherein the instructions comprise further instructions that, when executed by the processor, cause the apparatus to perform operations further comprising:
determining (1105) if a sub-band transient is above a threshold value based on $E_{oold}(k)$ and $E_{old}(k)$; and
responsive to a sub-band transient being above the threshold value, modifying the concealment method by selectively adjusting (1107) the spectrum magnitude of the substitution frame spectrum.

24. The decoder apparatus of Embodiment 22 wherein the substitution frame spectrum is calculated according to an expression of $$Z(m) = \alpha(m) \cdot \beta(m) \cdot Y(m) \cdot e^{j(\theta_k + \vartheta(m))}$$

and adjusting the spectrum magnitude comprises adjusting β(m) (1107), where Z(m) is the substitution frame spectrum, α (m) is a first magnitude attenuation factor, β(m) is a second magnitude attenuation factor, Y(m) is a protype frame, $\theta_k$ is a phase shift, and $\vartheta(m)$ is an additive phase component 25. The decoder apparatus of any of Embodiments 1-10 wherein the instructions comprise further instructions that, when executed by the processor, cause the apparatus to perform operations further comprising:
receiving a bad frame indicator (403, 501);
responsive to receiving the bad frame indicator, flushing the $shape_{oold}$ buffer and the $E\_w_{oold}$ energy buffer;
receiving a new audio frame of the received audio signal;
determining values of a new spectral shape (503) based upon decoded MDCT coefficients from the decoded new audio frame and storing the calculated values of the new spectral shape in the $shape_{old}$ buffer and the $shape_{oold}$ buffer (405), the new spectral shape comprising a number of sub-bands; and
determining a new frame energy (505) of the audio frame and storing the calculated new frame energy in the $E\_w_{old}$ buffer and the $E\_w_{oold}$ buffer (407).

ADDITIONAL EXPLANATION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description. Appendix 1 forms a part of this disclosure.

Appendix 1

WO2014123471
METHOD AND APPARATUS FOR CONTROLLING AUDIO FRAME LOSS CONCEALMENT

Technical Field

The application relates to methods and apparatuses for controlling a concealment method for a lost audio frame of a received audio signal.

Background

Conventional audio communication systems transmit speech and audio signals in frames, meaning that the sending side first arranges the signal in short segments or frames of e.g. 20-40 ms which subsequently are encoded and transmitted as a logical unit in e.g. a transmission packet. The receiver decodes each of these units and reconstructs the corresponding signal frames, which in turn are finally output as continuous sequence of reconstructed signal samples. Prior to encoding there is usually an analog to digital (A/D) conversion step that converts the analog speech or audio signal from a microphone into a sequence of audio samples. Conversely, at the receiving end, there is typically a final D/A conversion step that converts the sequence of reconstructed digital signal samples into a time continuous analog signal for loudspeaker playback.

However, such transmission system for speech and audio signals may suffer from transmission errors, which could lead to a situation in which one or several of the transmitted frames are not available at the receiver for reconstruction. In that case, the decoder has to generate a substitution signal for each of the erased, i.e. unavailable frames. This is done in the so-called frame loss or error concealment unit of the receiver-side signal decoder. The purpose of the frame loss concealment is to make the frame loss as inaudible as possible and hence to mitigate the impact of the frame loss on the reconstructed signal quality as much as possible.

Conventional frame loss concealment methods may depend on the structure or architecture of the codec, e.g. by applying a form of repetition of previously received codec parameters. Such parameter repetition techniques are clearly dependent on the specific parameters of the used codec and hence not easily applicable for other codecs with a different structure. Current frame loss concealment methods may e.g. apply the concept of freezing and extrapolating parameters of a previously received frame in order to generate a substitution frame for the lost frame.

These state of the art frame loss concealment methods incorporate some burst loss handling schemes. In general, after a number of frame losses in a row the synthesized signal is attenuated until it is completely muted after long bursts of errors. In addition the coding parameters that are essentially repeated and extrapolated are modified such that the attenuation is accomplished and that spectral peaks are flattened out.

Current state-of-the-art frame loss concealment techniques typically apply the concept of freezing and extrapolating parameters of a previously received frame in order to generate a substitution frame for the lost frame. Many parametric speech codecs such as linear predictive codecs like AMR or AMR-WB typically freeze the earlier received parameters or use some extrapolation thereof and use the decoder with them. In essence, the principle is to have a given model for coding/decoding and to apply the same model with frozen or extrapolated parameters. The frame loss concealment techniques of the AMR and AMR-WB can be regarded as representative. They are specified in detail in the corresponding standards specifications.

Many codecs out of the class of audio codecs apply for coding frequency domain techniques. This means that after some frequency domain transform a coding model is applied on spectral parameters. The decoder reconstructs the signal spectrum from the received parameters and finally transforms the spectrum back to a time signal. Typically, the time signal is reconstructed frame by frame. Such frames are combined by overlap-add techniques to the final reconstructed signal. Even in that case of audio codecs, state-of-the-art error concealment typically applies the same or at least a similar decoding model for lost frames. The frequency domain parameters from a previously received frame are frozen or suitably extrapolated and then used in the frequency-to-time domain conversion. Examples for such techniques are provided with the 3GPP audio codecs according to 3GPP standards.

Summary

Current state-of-the-art solutions for frame loss concealment typically suffer from quality impairments. The main problem is that the parameter freezing and extrapolation technique and re-application of the same decoder model even for lost frames does not always guarantee a smooth and faithful signal evolution from the previously decoded signal frames to the lost frame. This leads typically to audible signal discontinuities with corresponding quality impact.

New schemes for frame loss concealment for speech and audio transmission systems are described. The new schemes improve the quality in case of frame loss over the quality achievable with prior-art frame loss concealment techniques.

The objective of the present embodiments is to control a frame loss concealment scheme that preferably is of the type of the related new methods described such that the best possible sound quality of the reconstructed signal is achieved. The embodiments aim at optimizing this reconstruction quality both with respect to the properties of the signal and of the temporal distribution of the frame losses. Particularly problematic for the frame loss concealment to provide good quality are cases when the audio signal has strongly varying properties such as energy onsets or offsets or if it is spectrally very fluctuating. In that case the described concealment methods may repeat the onset, offset or spectral fluctuation leading to large deviations from the original signal and corresponding quality loss.

Another problematic case is if bursts of frame losses occur in a row. Conceptually, the scheme for frame loss concealment according to the methods described can cope with such cases, though it turns out that annoying tonal artifacts may still occur. It is another objective of the present embodiments to mitigate such artifacts to the highest possible degree.

According to a first aspect, a method for a decoder of concealing a lost audio frame comprises detecting in a property of the previously received and reconstructed audio signal, or in a statistical property of observed frame losses, a condition for which the substitution of a lost frame provides relatively reduced quality. In case such a condition is detected, modifying the concealment method by selectively adjusting a phase or a spectrum magnitude of a substitution frame spectrum.

According to a second aspect, a decoder is configured to implement a concealment of a lost audio frame, and comprises a controller configured to detect in a property of the previously received and reconstructed audio signal, or in a statistical property of observed frame losses, a condition for which the substitution of a lost frame provides relatively reduced quality. In case such a condition is detected, the controller is configured to modify the concealment method by selectively adjusting a phase or a spectrum magnitude of a substitution frame spectrum.

The decoder can be implemented in a device, such as e.g. a mobile phone.

According to a third aspect, a receiver comprises a decoder according to the second aspect described above.

According to a fourth aspect, a computer program is defined for concealing a lost audio frame, and the computer program comprises instructions which when run by a processor causes the processor to conceal a lost audio frame, in agreement with the first aspect described above.

According to a fifth aspect, a computer program product comprises a computer readable medium storing a computer program according to the above-described fourth aspect.

An advantage with an embodiment addresses the control of adaptations frame loss concealment methods allowing mitigating the audible impact of frame loss in the transmission of coded speech and audio signals even further over the quality achieved with only the described concealment methods. The general benefit of the embodiments is to provide a smooth and faithful evolution of the reconstructed signal even for lost frames. The audible impact of frame losses is greatly reduced in comparison to using state-of-the-art techniques.

Brief Description of the Drawings

For a more complete understanding of example embodiments of the present invention, reference is now made to the following description taken in connection with the accompanying drawings in which:

FIG. 1 shows a rectangular window function.

FIG. 2 shows a combination of the Hamming window with the rectangular window.

FIG. 3 shows an example of a magnitude spectrum of a window function.

FIG. 4 illustrates a line spectrum of an exemplary sinusoidal signal with the frequency $f_k$.

FIG. 5 shows a spectrum of a windowed sinusoidal signal with the frequency $f_k$.

FIG. 6 illustrates bars corresponding to the magnitude of grid points of a DFT, based on an analysis frame.

FIG. 7 illustrates a parabola fitting through DFT grid points P1, P2 and P3.

FIG. 8 illustrates a fitting of a main lobe of a window spectrum.

FIG. 9 illustrates a fitting of main lobe approximation function P through DFT grid points P1 and P2.

Figure 10:
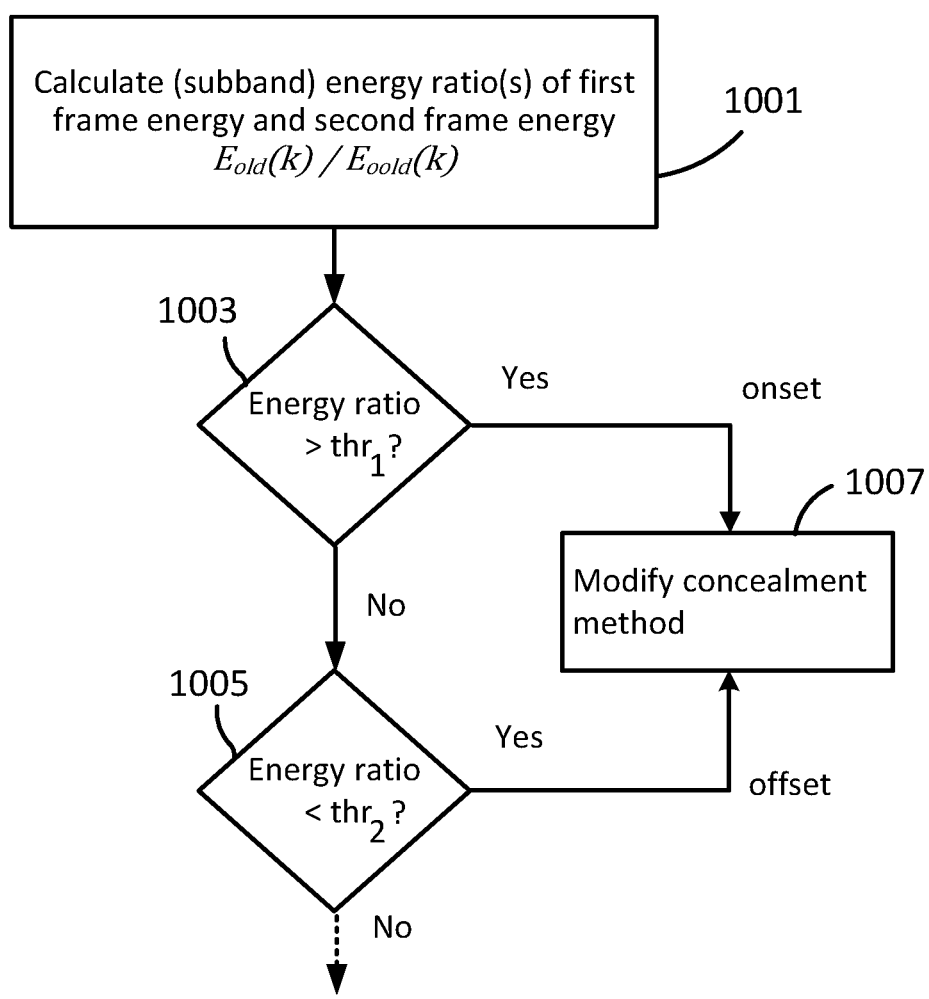
FIG. 10 is a flowchart illustrating modifying a concealment method in accordance with some embodiments of inventive concepts.

FIG. 10 is a flow chart illustrating an example method according to embodiments of the invention for controlling a concealment method for a lost audio frame of a received audio signal.

FIG. 11 is a flow chart illustrating another example method according to embodiments of the invention for controlling a concealment method for a lost audio frame of a received audio signal.

FIG. 12 illustrates another example embodiment of the invention.

FIG. 13 shows an example of an apparatus according to an embodiment of the invention.

FIG. 14 shows another example of an apparatus according to an embodiment of the invention.

FIG. 15 shows another example of an apparatus according to an embodiment of the invention.

Detailed Description

The new controlling scheme for the new frame loss concealment techniques described involve the following steps as shown in FIG. 10. It should be noted that the method can be implemented in a controller in a decoder.

1. Detect conditions in the properties of the previously received and reconstructed audio signal or in the statistical properties of the observed frame losses for which the substitution of a lost frame according to the described methods provides relatively reduced quality, 101.
2. In case such a condition is detected in step 1, modify the element of the methods according to which the substitution frame spectrum is calculated by $Z(m)=Y(m) \cdot e^{j\Theta_k}$ by selectively adjusting the phases or the spectrum magnitudes, 102.

Sinusoidal Analysis

A first step of the frame loss concealment technique to which the new controlling technique may be applied involves a sinusoidal analysis of a part of the previously received signal. The purpose of this sinusoidal analysis is to find the frequencies of the main sinusoids of that signal, and the underlying assumption is that the signal is composed of a limited number of individual sinusoids, i.e. that it is a multi-sine signal of the following type:

$$s(n) = \sum_{k=1}^{K} a_k \cdot \cos\left(2\pi \frac{f_k}{f_s} \cdot n + \varphi_k\right).$$

In this equation K is the number of sinusoids that the signal is assumed to consist of. For each of the sinusoids with index k=1 ... K, $a_k$ is the amplitude, $f_k$ is the frequency, and $\varphi_k$ is the phase. The sampling frequency is denominated by $f_s$ and the time index of the time discrete signal samples s(n) by n.

It is of main importance to find as exact frequencies of the sinusoids as possible. While an ideal sinusoidal signal would have a line spectrum with line frequencies $f_k$, finding their true values would in principle require infinite measurement time. Hence, it is in practice difficult to find these frequencies since they can only be estimated based on a short measurement period, which corresponds to the signal segment used for the sinusoidal analysis described herein; this signal segment is hereinafter referred to as an analysis frame. Another difficulty is that the signal may in practice be time-variant, meaning that the parameters of the above equation vary over time. Hence, on the one hand it is desirable to use a long analysis frame making the measurement more accurate; on the other hand a short measurement period would be needed in order to better cope with possible signal variations. A good trade-off is to use an analysis frame length in the order of e.g. 20-40 ms.

A preferred possibility for identifying the frequencies of the sinusoids $f_k$ is to make a frequency domain analysis of the analysis frame. To this end the analysis frame is transformed into the frequency domain, e.g. by means of DFT or DCT or similar frequency domain transforms. In case a DFT of the analysis frame is used, the spectrum is given by:

$$X(m) = DFT(w(n) \cdot x(n)) = \sum_{n=0}^{L-1} e^{-j\frac{2\pi}{L}mn} \cdot w(n) \cdot x(n).$$

In this equation w(n) denotes the window function with which the analysis frame of length L is extracted and weighted. Typical window functions are e.g. rectangular windows that are equal to 1 for n∈[0 ... L−1] and otherwise 0 as shown in FIG. 1. It is assumed here that the time indexes of the previously received audio signal are set such that the analysis frame is referenced by the time indexes n=0 ... L−1. Other window functions that may be more suitable for spectral analysis are, e.g., Hamming window, Hanning window, Kaiser window or Blackman window. A window function that is found to be particular useful is a combination of the Hamming window with the rectangular window. This window has a rising edge shape like the left half of a Hamming window of length L1 and a falling edge shape like the right half of a Hamming window of length L1 and between the rising and falling edges the window is equal to 1 for the length of L−L1, as shown in FIG. 2.

The peaks of the magnitude spectrum of the windowed analysis frame |X(m)| constitute an approximation of the required sinusoidal frequencies $f_k$. The accuracy of this approximation is however limited by the frequency spacing of the DFT. With the DFT with block length L the accuracy is limited to $$\frac{f_s}{2L}.$$

Experiments show that this level of accuracy may be too low in the scope of the methods described herein. Improved accuracy can be obtained based on the results of the following consideration:

The spectrum of the windowed analysis frame is given by the convolution of the spectrum of the window function with the line spectrum of the sinusoidal model signal S(Ω), subsequently sampled at the grid points of the DFT:

$$X(m) = \int_{2\pi} \delta\left(\Omega - m \cdot \frac{2\pi}{L}\right) \cdot (W(\Omega) * S(\Omega)) \cdot d\Omega.$$

By using the spectrum expression of the sinusoidal model signal, this can be written as $$X(m) = \frac{1}{2} \int_{2\pi} \delta\left(\Omega - m \cdot \frac{2\pi}{L}\right) \sum_{k=1}^{K} a_k \cdot \left(\left(W\left(\Omega + 2\pi\frac{f_k}{f_s}\right) \cdot e^{-j\varphi_k} + W\left(\Omega - 2\pi\frac{f_k}{f_s}\right)e^{j\varphi_k}\right) \cdot d\Omega\right)$$

Hence, the sampled spectrum is given by $$X(m) = \frac{1}{2}\sum_{k=1}^{K} a_k \cdot \left(\left(W\left(2\pi\left(\frac{m}{L} + \frac{f_k}{f_s}\right)\right)\right) \cdot e^{-j\varphi_k} + W\left(2\pi\left(\frac{m}{L} - \frac{f_k}{f_s}\right)\right) \cdot e^{j\varphi_k}\right)$$

with m=0 ... L−1.

Based on this consideration it is assumed that the observed peaks in the magnitude spectrum of the analysis frame stem from a windowed sinusoidal signal with K sinusoids where the true sinusoid frequencies are found in the vicinity of the peaks. Let $m_k$ be the DFT index (grid point) of the observed $k^{th}$ peak, then the corresponding frequency is $$\hat{f}_k = \frac{m_k}{L} \cdot f_s$$

which can be regarded an approximation of the true sinusoidal frequency $f_k$. The true sinusoid frequency $f_k$ can be assumed to lie within the interval $$\left[\left(m_k - \frac{1}{2}\right) \cdot \frac{f_s}{L}, \left(m_k + \frac{1}{2}\right) \cdot \frac{f_s}{L}\right].$$

For clarity it is noted that the convolution of the spectrum of the window function with the spectrum of the line spectrum of the sinusoidal model signal can be understood as a superposition of frequency-shifted versions of the window function spectrum, whereby the shift frequencies are the frequencies of the sinusoids. This superposition is then sampled at the DFT grid points. These steps are illustrated by the following figures. FIG. 3 displays an example of the magnitude spectrum of a window function. FIG. 4 shows the magnitude spectrum (line spectrum) of an example sinusoidal signal with a single sinusoid of frequency. FIG. 5 shows the magnitude spectrum of the windowed sinusoidal signal that replicates and superposes the frequency-shifted window spectra at the frequencies of the sinusoid. The bars in FIG. 6 correspond to the magnitude of the grid points of the DFT of the windowed sinusoid that are obtained by calculating the DFT of the analysis frame. It should be noted that all spectra are periodic with the normalized frequency parameter $\Omega$ where $\Omega=2\pi$ that corresponds to the sampling frequency $f_s$.

The previous discussion and the illustration of FIG. 6 suggest that a better approximation of the true sinusoidal frequencies can only be found through increasing the resolution of the search over the frequency resolution of the used frequency domain transform.

One preferred way to find better approximations of the frequencies $f_k$ of the sinusoids is to apply parabolic interpolation. One such approach is to fit parabolas through the grid points of the DFT magnitude spectrum that surround the peaks and to calculate the respective frequencies belonging to the parabola maxima. A suitable choice for the order of the parabolas is 2. In detail the following procedure can be applied:

1. Identify the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2. For each peak k (with k=1 . . . K) with corresponding DFT index $m_k$ fit a parabola through the three points {P1; P2; P3}={($m_k$−1, log(|X($m_k$−1)|); ($m_k$, log(|X($m_k$)|); ($m_k$+1, log(|X($m_k$+1)|)}. This results in parabola coefficients $b_k(0)$, $b_k(1)$, $b_k(2)$ of the parabola defined by $$p_k(q) = \sum_{i=0}^{2} b_k(i) \cdot q^i.$$

This parabola fitting is illustrated in FIG. 7.

3. For each of the K parabolas calculate the interpolated frequency index $\hat{m}_k$ corresponding to the value of q for which the parabola has its maximum. Use $\hat{f}_k = \hat{m}_k \cdot f_s/L$ as approximation for the sinusoid frequency $f_k$.

The described approach provides good results but may have some limitations since the parabolas do not approximate the shape of the main lobe of the magnitude spectrum |W($\Omega$)| of the window function. An alternative scheme doing this is an enhanced frequency estimation using a main lobe approximation, described as follows. The main idea of this alternative is to fit a function P(q), which approximates the main lobe of $$\left| W\left(\frac{2\pi}{L} \cdot q\right) \right|,$$

through the grid points of the DFT magnitude spectrum that surround the peaks and to calculate the respective frequencies belonging to the function maxima. The function P(q) could be identical to the frequency-shifted magnitude spectrum $$\left| W\left(\frac{2\pi}{L} \cdot (q - \hat{q})\right) \right|$$

of the window function. For numerical simplicity it should however rather for instance be a polynomial which allows for straightforward calculation of the function maximum. The following detailed procedure can be applied:

1. Identify the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2. Derive the function P(q) that approximates the magnitude spectrum $$\left| W\left(\frac{2\pi}{L} \cdot q\right) \right|$$

of the window function or of the logarithmic magnitude spectrum $$\log \left| W\left(\frac{2\pi}{L} \cdot q\right) \right|$$

for a given interval ($q_1,q_2$). The choice of the approximation function approximating the window spectrum main lobe is illustrated by FIG. 8.

3. For each peak k (with k=1 . . . K) with corresponding DFT index $m_k$ fit the frequency-shifted function P(q−$\hat{q}_k$) through the two DFT grid points that surround the expected true peak of the continuous spectrum of the windowed sinusoidal signal. Hence, if |X($m_k$−1)| is larger than |X($m_k$+1)| fit P(q−$\hat{q}_k$) through the points {$P_1$; $P_2$}={($m_k$−1, log(|X($m_k$−1)|); ($m_k$, log(|X($m_k$)|)} and otherwise through the points {$P_1$; $P_2$}={($m_k$, log(|X($m_k$)|); ($m_k$+1, log(|X($m_k$+1)|)}. P(q) can for simplicity be chosen to be a polynomial either of order 2 or 4. This renders the approximation in step 2 a simple linear regression calculation and the calculation of $\hat{q}_k$ straightforward. The interval ($q_1,q_2$) can be chosen to be fixed and identical for all peaks, e.g. ($q_1,q_2$)=(−1,1), or adaptive.

In the adaptive approach the interval can be chosen such that the function P(q−$\hat{q}_k$) fits the main lobe of the window function spectrum in the range of the relevant DFT grid points {$P_1$; $P_2$}. The fitting process is visualized in FIG. 9.

4. For each of the K frequency shift parameters $\hat{q}_k$ for which the continuous spectrum of the windowed sinusoidal signal is expected to have its peak calculate $\hat{f}_k = \hat{q}_k \cdot f_s/L$ as approximation for the sinusoid frequency $f_k$.

There are many cases where the transmitted signal is harmonic meaning that the signal consists of sine waves which frequencies are integer multiples of some fundamental frequency $f_0$. This is the case when the signal is very periodic like for instance for voiced speech or the sustained tones of some musical instrument. This means that the frequencies of the sinusoidal model of the embodiments are not independent but rather have a harmonic relationship and stem from the same fundamental frequency. Taking this harmonic property into account can consequently improve the analysis of the sinusoidal component frequencies substantially.

One enhancement possibility is outlined as follows:

1. Check whether the signal is harmonic. This can for instance be done by evaluating the periodicity of signal prior to the frame loss. One straightforward method is to perform an autocorrelation analysis of the signal. The maximum of such autocorrelation function for some time lag τ>0 can be used as an indicator. If the value of this maximum exceeds a given threshold, the signal can be regarded harmonic. The corresponding time lag τ then corresponds to the period of the signal which is related to the fundamental frequency through $$f_0 = \frac{f_s}{\tau}.$$

Many linear predictive speech coding methods apply so-called open or closed-loop pitch prediction or CELP coding using adaptive codebooks. The pitch gain and the associated pitch lag parameters derived by such coding methods are also useful indicators if the signal is harmonic and, respectively, for the time lag.

A further method for obtaining $f_0$ is described below.

2. For each harmonic index j within the integer range check whether there is a peak in the (logarithmic) DFT magnitude spectrum of the analysis frame within the vicinity of the harmonic frequency $f_j=j \cdot f_0$. The vicinity of $f_j$ may be defined as the delta range around $f_j$ where delta corresponds to the frequency resolution of the DFT $$\frac{f_s}{L},$$

i.e. the interval $$\left[j \cdot f_0 - \frac{f_s}{2 \cdot L}, j \cdot f_0 + \frac{f_s}{2 \cdot L}\right].$$

In case such a peak with corresponding estimated sinusoidal frequency $\hat{f}_k$ is present, supersede $\hat{f}_k$ by $\hat{f}_k = j \cdot f_0$.

For the two-step procedure given above there is also the possibility to make the check whether the signal is harmonic and the derivation of the fundamental frequency implicitly and possibly in an iterative fashion without necessarily using indicators from some separate method. An example for such a technique is given as follows:

For each $f_{0,p}$ out of a set of candidate values $\{f_{0,1} \ldots f_{0,P}\}$ apply the procedure step 2, though without superseding $\hat{f}_k$ but with counting how many DFT peaks are present within the vicinity around the harmonic frequencies, i.e. the integer multiples of $f_{0,p}$. Identify the fundamental frequency $f_{0,pmax}$ for which the largest number of peaks at or around the harmonic frequencies is obtained. If this largest number of peaks exceeds a given threshold, then the signal is assumed to be harmonic. In that case $f_{0,pmax}$ can be assumed to be the fundamental frequency with which step 2 is then executed leading to enhanced sinusoidal frequencies $\hat{f}_k$. A more preferable alternative is however first to optimize the fundamental frequency $f_0$ based on the peak frequencies $\hat{f}_k$ that have been found to coincide with harmonic frequencies. Assume a set of M harmonics, i.e. integer multiples $\{n_1 \ldots n_M\}$ of some fundamental frequency that have been found to coincide with some set of M spectral peaks at frequencies $\hat{f}_{k\,(m)}$, m=1 . . . M, then the underlying (optimized) fundamental frequency $f_{0,opt}$ can be calculated to minimize the error between the harmonic frequencies and the spectral peak frequencies. If the error to be minimized is the mean square error $$E_2 = \sum_{m=1}^{M} \left(n_m \cdot f_0 - \hat{f}_{k(m)}\right)^2,$$

then the optimal fundamental frequency is calculated as $$f_{0,opt} = \frac{\sum_{m=1}^{M} n_m \cdot \hat{f}_{k(m)}}{\sum_{m=1}^{M} n_m^2}.$$

The initial set of candidate values $\{f_{0,1} \ldots f_{0,P}\}$ can be obtained from the frequencies of the DFT peaks or the estimated sinusoidal frequencies $\hat{f}_k$.

A further possibility to improve the accuracy of the estimated sinusoidal frequencies $\hat{f}_k$ is to consider their temporal evolution. To that end, the estimates of the sinusoidal frequencies from a multiple of analysis frames can be combined for instance by means of averaging or prediction. Prior to averaging or prediction a peak tracking can be applied that connects the estimated spectral peaks to the respective same underlying sinusoids.

Applying the Sinusoidal Model

The application of a sinusoidal model in order to perform a frame loss concealment operation described herein may be described as follows.

It is assumed that a given segment of the coded signal cannot be reconstructed by the decoder since the corresponding encoded information is not available. It is further assumed that a part of the signal prior to this segment is available. Let y(n) with n=0 . . . N−1 be the unavailable segment for which a substitution frame z(n) has to be generated and y(n) with n<0 be the available previously decoded signal. Then, in a first step a prototype frame of the available signal of length L and start index $n_{-1}$ is extracted with a window function w(n) and transformed into frequency domain, e.g. by means of DFT:

$$Y_{-1}(m) = \sum_{n=0}^{L-1} y(n - n_{-1}) \cdot w(n) \cdot e^{j\frac{2\pi}{L}nm}.$$

The window function can be one of the window functions described above in the sinusoidal analysis. Preferably, in order to save numerical complexity, the frequency domain transformed frame should be identical with the one used during sinusoidal analysis.

In a next step the sinusoidal model assumption is applied. According to that the DFT of the prototype frame can be written as follows:

$$Y_{-1}(m) = \frac{1}{2}\sum_{k=1}^{K} a_k \cdot \left(\left(W\left(2\pi\left(\frac{m}{L} + \frac{f_k}{f_s}\right)\right) \cdot e^{-j\varphi_k} + W\left(2\pi\left(\frac{m}{L} - \frac{f_k}{f_s}\right)\right) \cdot e^{j\varphi_k}\right)\right).$$

The next step is to realize that the spectrum of the used window function has only a significant contribution in a frequency range close to zero. As illustrated in FIG. 3 the magnitude spectrum of the window function is large for frequencies close to zero and small otherwise (within the normalized frequency range from $-\pi$ to $\pi$, corresponding to half the sampling frequency). Hence, as an approximation it is assumed that the window spectrum W(m) is non-zero only for an interval M=$[-m_{min}, m_{max}]$, with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e. from one shifted window spectrum. This means that the expression above reduces to the following approximate expression:

$$\hat{Y}_{-1}(m) = \frac{a_k}{2} \cdot W\left(2\pi\left(\frac{m}{L} - \frac{f_k}{f_s}\right)\right) \cdot e^{j\varphi_k}$$

for non-negative $m \in M_k$ and for each k.

Herein, $M_k$ denotes the integer interval $$M_k = \left[\text{round}\left(\frac{f_k}{f_s} \cdot L\right) - m_{min,k}, \text{round}\left(\frac{f_k}{f_s} \cdot L\right) + m_{max,k}\right],$$

where $m_{min,k}$ and $m_{max,k}$ fulfill the above explained constraint such that the intervals are not overlapping. A suitable choice for $m_{min,k}$ and $m_{max,k}$ is to set them to a small integer value $\delta$, e.g. $\delta$=3. If however the DFT indices related to two neighboring sinusoidal frequencies $f_k$ and $f_{k+1}$ are less than $2\delta$, then $\delta$ is set to $$\text{floor}\left(\frac{\text{round}\left(\frac{f_{k+1}}{f_s} \cdot L\right) - \text{round}\left(\frac{f_k}{f_s} \cdot L\right)}{2}\right)$$

such that it is ensured that the intervals are not overlapping. The function floor (•) is the closest integer to the function argument that is smaller or equal to it.

The next step according to the embodiment is to apply the sinusoidal model according to the above expression and to evolve its K sinusoids in time. The assumption that the time indices of the erased segment compared to the time indices of the prototype frame differs by samples means that the phases of the sinusoids advance by $$\theta_k = 2\pi \cdot \frac{f_k}{f_s} n_{-1}.$$

Hence, the DFT spectrum of the evolved sinusoidal model is given by:

$$Y_0(m) = \frac{1}{2}\sum_{k=1}^{K} a_k \cdot \left(\left(W\left(2\pi\left(\frac{m}{L} + \frac{f_k}{f_s}\right)\right) \cdot e^{-j(\varphi_k + \theta_k)} + W\left(2\pi\left(\frac{m}{L} - \frac{f_k}{f_s}\right)\right) \cdot e^{j(\varphi_k + \theta_k)}\right)\right).$$

Applying again the approximation according to which the shifted window function spectra do no overlap gives:

$$\hat{Y}_0(m) = \frac{a_k}{2} \cdot W\left(2\pi\left(\frac{m}{L} - \frac{f_k}{f_s}\right)\right) \cdot e^{j(\varphi_k + \theta_k)}$$

for non-negative m c Mk and for each k.

Comparing the DFT of the prototype frame $Y_{-1}(m)$ with the DFT of evolved sinusoidal model $Y_0(m)$ by using the approximation, it is found that the magnitude spectrum remains unchanged while the phase is shifted by $$\theta_k = 2\pi \cdot \frac{f_k}{f_s} n_{-1},$$

for each $m \in M_k$. Hence, the frequency spectrum coefficients of the prototype frame in the vicinity of each sinusoid are shifted proportional to the sinusoidal frequency $f_k$ and the time difference between the lost audio frame and the prototype frame $n_{-1}$.

Hence, according to the embodiment the substitution frame can be calculated by the following expression:

$z(n)$=IDTF$\{Z(m)\}$ with $Z(m)$=$Y(m) \cdot e^{j\theta_k}$ for non-negative $m \in M_k$ and for each k.

A specific embodiment addresses phase randomization for DFT indices not belonging to any interval $M_k$. As described above, the intervals $M_k$, k=1 . . . K have to be set such that they are strictly non-overlapping which is done using some parameter $\delta$ which controls the size of the intervals. It may happen that $\delta$ is small in relation to the frequency distance of two neighboring sinusoids. Hence, in that case it happens that there is a gap between two intervals. Consequently, for the corresponding DFT indices m no phase shift according to the above expression Z(m)=Y(m)·$e^{j\theta_k}$ is defined. A suitable choice according to this embodiment is to randomize the phase for these indices, yielding Z(m)=Y(m)·$e^{j2\pi rand(\cdot)}$, where the function rand(•) returns some random number.

It has been found beneficial for the quality of the reconstructed signals to optimize the size of the intervals $M_k$. In particular, the intervals should be larger if the signal is very tonal, i.e. when it has clear and distinct spectral peaks. This is the case for instance when the signal is harmonic with a clear periodicity. In other cases where the signal has less pronounced spectral structure with broader spectral maxima, it has been found that using small intervals leads to better quality. This finding leads to a further improvement according to which the interval size is adapted according to the properties of the signal. One realization is to use a tonality or a periodicity detector. If this detector identifies the signal as tonal, the $\delta$-parameter controlling the interval size is set to a relatively large value. Otherwise, the $\delta$-parameter is set to relatively smaller values.

Based on the above, the audio frame loss concealment methods involve the following steps:

1. Analyzing a segment of the available, previously synthesized signal to obtain the constituent sinusoidal frequencies $f_k$ of a sinusoidal model, optionally using an enhanced frequency estimation.

2. Extracting a prototype frame $y_{-1}$ from the available previously synthesized signal and calculate the DFT of that frame.

3. Calculating the phase shift $\theta_k$ for each sinusoid k in response to the sinusoidal frequency $f_k$ and the time advance between the prototype frame and the substitution frame. Optionally in this step the size of the interval M may have been adapted in response to the tonality of the audio signal.

4. For each sinusoid k advancing the phase of the prototype frame DFT with $\theta_k$ selectively for the DFT indices related to a vicinity around the sinusoid frequency $f_k$.

5. Calculating the inverse DFT of the spectrum obtained in step 4.

Signal and Frame Loss Property Analysis and Detection

The methods described above are based on the assumption that the properties of the audio signal do not change significantly during the short time duration from the previously received and reconstructed signal frame and a lost frame. In that case it is a very good choice to retain the magnitude spectrum of the previously reconstructed frame and to evolve the phases of the sinusoidal main components detected in the previously reconstructed signal. There are however cases where this assumption is wrong which are for instance transients with sudden energy changes or sudden spectral changes.

A first embodiment of a transient detector according to the invention can consequently be based on energy variations within the previously reconstructed signal. This method, illustrated in FIG. 11, calculates the energy in a left part and a right part of some analysis frame 113. The analysis frame may be identical to the frame used for sinusoidal analysis described above. A part (either left or right) of the analysis frame may be the first or respectively the last half of the analysis frame or e.g. the first or respectively the last quarter of the analysis frame, 110. The respective energy calculation is done by summing the squares of the samples in these partial frames:

$$E_{left} = \sum_{n=0}^{N_{part}-1} y^2(n - n_{left}), \text{ and}$$

$$E_{right} = \sum_{n=0}^{N_{part}-1} y^2(n - n_{right}).$$

Herein y(n) denotes the analysis frame, $n_{left}$ and $n_{right}$ denote the respective start indices of the partial frames that are both of size $N_{part}$.

Now the left and right partial frame energies are used for the detection of a signal discontinuity. This is done by calculating the ratio $$R_{l/r} = \frac{E_{left}}{E_{right}}.$$

A discontinuity with sudden energy decrease (offset) can be detected if the ratio $R_{l/r}$ exceeds some threshold (e.g. 10), 115. Similarly a discontinuity with sudden energy increase (onset) can be detected if the ratio $R_{l/r}$ is below some other threshold (e.g. 0.1), 117.

In the context of the above described concealment methods it has been found that the above defined energy ratio may in many cases be a too insensitive indicator. In particular in real signals and especially music there are cases where a tone at some frequency suddenly emerges while some other tone at some other frequency suddenly stops. Analyzing such a signal frame with the above-defined energy ratio would in any case lead to a wrong detection result for at least one of the tones since this indicator is insensitive to different frequencies.

A solution to this problem is described in the following embodiment. The transient detection is now done in the time frequency plane. The analysis frame is again partitioned into a left and a right partial frame, 110. Though now, these two partial frames are (after suitable windowing with e.g. a Hamming window, 111) transformed into the frequency domain, e.g. by means of a $N_{part}$-point DFT, 112.

$Y_{left}(m) = DFT\{y(n - n_{left})\}_{N_{part}}$ and $Y_{right}(m) = DFT\{y(n - n_{right})\}_{N_{part}}$, with $m = 0 \ldots N_{part} - 1$.

Now the transient detection can be done frequency selectively for each DFT bin with index m. Using the powers of the left and right partial frame magnitude spectra, for each DFT index m a respective energy ratio can be calculated 113 as $$R_{l/r}(m) = \frac{|Y_{left}(m)|^2}{|Y_{right}(m)|^2}.$$

Experiments show that frequency selective transient detection with DFT bin resolution is relatively imprecise due to statistical fluctuations (estimation errors). It was found that the quality of the operation is rather enhanced when making the frequency selective transient detection on the basis of frequency bands. Let $l_k = [m_{k-1}+1, \ldots, m_k]$ specify the $k^{th}$ interval, $k = 1 \ldots K$, covering the DFT bins from $m_{k-1}+1$ to $m_k$, then these intervals define K frequency bands. The frequency group selective transient detection can now be based on the band-wise ratio between the respective band energies of the left and right partial frames:

$$R_{l/r,band}(k) = \frac{\sum_{m \in l_k} |Y_{left}(m)|^2}{\sum_{m \in l_k} |Y_{right}(m)|^2}.$$

It is to be noted that the interval $l_k = \{m_{k-1}+1, \ldots, m_k\}$ corresponds to the frequency band $$B_k = \left[ \frac{m_{k-1}+1}{N_{part}} \cdot f_s, \ldots, \frac{m_k}{N_{part}} \cdot f_s \right],$$

where $f_s$ denotes the audio sampling frequency.

The lowest lower frequency band boundary $m_0$ can be set to 0 but may also be set to a DFT index corresponding to a larger frequency in order to mitigate estimation errors that grow with lower frequencies. The highest upper frequency band boundary $m_k$ can be set to $$\frac{N_{part}}{2}$$

but is preferably chosen to correspond to some lower frequency in which a transient still has a significant audible effect.

A suitable choice for these frequency band sizes or widths is either to make them equal size with e.g. a width of several 100 Hz. Another preferred way is to make the frequency band widths following the size of the human auditory critical bands, i.e. to relate them to the frequency resolution of the auditory system. This means approximately to make the frequency band widths equal for frequencies up to 1 kHz and to increase them exponentially above 1 kHz. Exponential increase means for instance to double the frequency bandwidth when incrementing the band index k.

As described in the first embodiment of the transient detector that was based on an energy ratio of two partial frames, any of the ratios related to band energies or DFT bin energies of two partial frames are compared to certain thresholds. A respective upper threshold for (frequency selective) offset detection 115 and a respective lower threshold for (frequency selective) onset detection 117 is used.

A further audio signal dependent indicator that is suitable for an adaptation of the frame loss concealment method can be based on the codec parameters transmitted to the decoder. For instance, the codec may be a multi-mode codec like ITU-T G.718. Such codec may use particular codec modes for different signal types and a change of the codec mode in a frame shortly before the frame loss may be regarded as an indicator for a transient.

Another useful indicator for adaptation of the frame loss concealment is a codec parameter related to a voicing property and the transmitted signal. Voicing relates to highly periodic speech that is generated by a periodic glottal excitation of the human vocal tract.

A further preferred indicator is whether the signal content is estimated to be music or speech. Such an indicator can be obtained from a signal classifier that may typically be part of the codec. In case the codec performs such a classification and makes a corresponding classification decision available as a coding parameter to the decoder, this parameter is preferably used as signal content indicator to be used for adapting the frame loss concealment method.

Another indicator that is preferably used for adaptation of the frame loss concealment methods is the burstiness of the frame losses. Burstiness of frame losses means that there occur several frame losses in a row, making it hard for the frame loss concealment method to use valid recently decoded signal portions for its operation. A state-of-the-art indicator is the number $n_{burst}$ of observed frame losses in a row. This counter is incremented with one upon each frame loss and reset to zero upon the reception of a valid frame. This indicator is also used in the context of the present example embodiments of the invention.

Adaptation of the Frame Loss Concealment Method

In case the steps carried out above indicate a condition suggesting an adaptation of the frame loss concealment operation the calculation of the spectrum of the substitution frame is modified.

While the original calculation of the substitution frame spectrum is done according to the expression $Z(m)=Y(m) \cdot e^{j\theta_k}$, now an adaptation is introduced modifying both magnitude and phase. The magnitude is modified by means of scaling with two factors $\alpha(m)$ and $\beta(m)$ and the phase is modified with an additive phase component $\vartheta(m)$. This leads to the following modified calculation of the substitution frame:

$$Z(m)=\alpha(m) \cdot \beta(m) \cdot Y(m) \cdot e^{j(\theta_k+\vartheta(m))}.$$

It is to be noted that the original (non-adapted) frame-loss concealment methods is used if $\alpha(m)=1$, $\beta(m)=1$, and $\vartheta(m)=0$. These respective values are hence the default.

The general objective with introducing magnitude adaptations is to avoid audible artifacts of the frame loss concealment method. Such artifacts may be musical or tonal sounds or strange sounds arising from repetitions of transient sounds. Such artifacts would in turn lead to quality degradations, which avoidance is the objective of the described adaptations. A suitable way to such adaptations is to modify the magnitude spectrum of the substitution frame to a suitable degree.

FIG. 12 illustrates an embodiment of concealment method modification. Magnitude adaptation, 123, is preferably done if the burst loss counter $n_{burst}$ exceeds some threshold $thr_{burst}$, e.g. $thr_{burst}=3$, 121. In that case a value smaller than 1 is used for the attenuation factor, e.g. $\alpha(m)=0.1$.

It has however been found that it is beneficial to perform the attenuation with gradually increasing degree. One preferred embodiment which accomplishes this is to define a logarithmic parameter specifying a logarithmic increase in attenuation per frame, att_per_frame. Then, in case the burst counter exceeds the threshold the gradually increasing attenuation factor is calculated by $$\alpha(m)=10^{c \cdot att\_per\_frame(n_{burst}-thr_{burst})}.$$

Here the constant c is mere a scaling constant allowing to specify the parameter att_per_frame for instance in decibels (dB).

An additional preferred adaptation is done in response to the indicator whether the signal is estimated to be music or speech. For music content in comparison with speech content it is preferable to increase the threshold $thr_{burst}$ and to decrease the attenuation per frame. This is equivalent with performing the adaptation of the frame loss concealment method with a lower degree. The background of this kind of adaptation is that music is generally less sensitive to longer loss bursts than speech. Hence, the original, i.e. the unmodified frame loss concealment method is still preferable for this case, at least for a larger number of frame losses in a row.

A further adaptation of the concealment method with regards to the magnitude attenuation factor is preferably done in case a transient has been detected based on that the indicator $R_{l/r,band}(k)$ or alternatively $R_{l/r}(m)$ or $R_{l/r}$ have passed a threshold, 122. In that case a suitable adaptation action, 125, is to modify the second magnitude attenuation factor $\beta(m)$ such that the total attenuation is controlled by the product of the two factors $\alpha(m) \cdot \beta(m)$.

$\beta(m)$ is set in response to an indicated transient. In case an offset is detected the factor $\beta(m)$ is preferably be chosen to reflect the energy decrease of the offset. A suitable choice is to set $\beta(m)$ to the detected gain change:

$$\beta(m)=\sqrt{R_{l/r,band}(k)}, \text{ for } m \in I_k, k=1 \ldots K.$$

In case an onset is detected it is rather found advantageous to limit the energy increase in the substitution frame. In that case the factor can be set to some fixed value of e.g. 1, meaning that there is no attenuation but not any amplification either.

In the above it is to be noted that the magnitude attenuation factor is preferably applied frequency selectively, i.e. with individually calculated factors for each frequency band. In case the band approach is not used, the corresponding magnitude attenuation factors can still be obtained in an analogue way. $\beta(m)$ can then be set individually for each DFT bin in case frequency selective transient detection is used on DFT bin level. Or, in case no frequency selective transient indication is used at all β(m) can be globally identical for all m.

A further preferred adaptation of the magnitude attenuation factor is done in conjunction with a modification of the phase by means of the additional phase component ϑ(m) 127. In case for a given m such a phase modification is used, the attenuation factor β(m) is reduced even further. Preferably, even the degree of phase modification is taken into account. If the phase modification is only moderate, β(m) is only scaled down slightly, while if the phase modification is strong, β(m) is scaled down to a larger degree.

The general objective with introducing phase adaptations is to avoid too strong tonality or signal periodicity in the generated substitution frames, which in turn would lead to quality degradations. A suitable way to such adaptations is to randomize or dither the phase to a suitable degree.

Such phase dithering is accomplished if the additional phase component ϑ(m) is set to a random value scaled with some control factor: ϑ(m)=a(m)·rand(•).

The random value obtained by the function rand(•) is for instance generated by some pseudo-random number generator. It is here assumed that it provides a random number within the interval [0, 2π].

The scaling factor α(m) in the above equation control the degree by which the original phase $\theta_k$ is dithered. The following embodiments address the phase adaptation by means of controlling this scaling factor. The control of the scaling factor is done in an analogue way as the control of the magnitude modification factors described above.

According to a first embodiment scaling factor a(m) is adapted in response to the burst loss counter. If the burst loss counter $n_{burst}$ exceeds some threshold $thr_{burst}$, e.g. $thr_{burst}$=3, a value larger than 0 is used, e.g. a(m)=0.2.

It has however been found that it is beneficial to perform the dithering with gradually increasing degree. One preferred embodiment which accomplishes this is to define a parameter specifying an increase in dithering per frame, dith_increase_per_frame. Then in case the burst counter exceeds the threshold the gradually increasing dithering control factor is calculated by $$a(m)=\text{dith\_increase\_per\_frame} \cdot (n_{burst}-thr_{burst}).$$

It is to be noted in the above formula that α(m) has to be limited to a maximum value of 1 for which full phase dithering is achieved.

It is to be noted that the burst loss threshold value $thr_{burst}$ used for initiating phase dithering may be the same threshold as the one used for magnitude attenuation. However, better quality can be obtained by setting these thresholds to individually optimal values, which generally means that these thresholds may be different.

An additional preferred adaptation is done in response to the indicator whether the signal is estimated to be music or speech. For music content in comparison with speech content it is preferable to increase the threshold $thr_{burst}$ meaning that phase dithering for music as compared to speech is done only in case of more lost frames in a row. This is equivalent with performing the adaptation of the frame loss concealment method for music with a lower degree. The background of this kind of adaptation is that music is generally less sensitive to longer loss bursts than speech. Hence, the original, i.e. unmodified frame loss concealment method is still preferable for this case, at least for a larger number of frame losses in a row.

A further preferred embodiment is to adapt the phase dithering in response to a detected transient. In that case a stronger degree of phase dithering can be used for the DFT bins m for which a transient is indicated either for that bin, the DFT bins of the corresponding frequency band or of the whole frame.

Part of the schemes described address optimization of the frame loss concealment method for harmonic signals and particularly for voiced speech.

In case the methods using an enhanced frequency estimation as described above are not realized another adaptation possibility for the frame loss concealment method optimizing the quality for voiced speech signals is to switch to some other frame loss concealment method that specifically is designed and optimized for speech rather than for general audio signals containing music and speech. In that case, the indicator that the signal comprises a voiced speech signal is used to select another speech-optimized frame loss concealment scheme rather than the schemes described above.

The embodiments apply to a controller in a decoder, as illustrated in FIG. 13. FIG. 13 is a schematic block diagram of a decoder according to the embodiments. The decoder 130 comprises an input unit 132 configured to receive an encoded audio signal. The figure illustrates the frame loss concealment by a logical frame loss concealment-unit 134, which indicates that the decoder is configured to implement a concealment of a lost audio frame, according to the above-described embodiments. Further the decoder comprises a controller 136 for implementing the embodiments described above. The controller 136 is configured to detect conditions in the properties of the previously received and reconstructed audio signal or in the statistical properties of the observed frame losses for which the substitution of a lost frame according to the described methods provides relatively reduced quality. In case such a condition is detected, the controller 136 is configured to modify the element of the concealment methods according to which the substitution frame spectrum is calculated by $Z(m)=Y(m) \cdot e^{j\theta_k}$ by selectively adjusting the phases or the spectrum magnitudes. The detection can be performed by a detector unit 146 and modifying can be performed by a modifier unit 148 as illustrated in FIG. 14.

The decoder with its including units could be implemented in hardware. There are numerous variants of circuitry elements that can be used and combined to achieve the functions of the units of the decoder. Such variants are encompassed by the embodiments. Particular examples of hardware implementation of the decoder is implementation in digital signal processor (DSP) hardware and integrated circuit technology, including both general-purpose electronic circuitry and application-specific circuitry.

The decoder 150 described herein could alternatively be implemented e.g. as illustrated in FIG. 15, i.e. by one or more of a processor 154 and adequate software 155 with suitable storage or memory 156 therefore, in order to reconstruct the audio signal, which includes performing audio frame loss concealment according to the embodiments described herein, as shown in FIG. 13. The incoming encoded audio signal is received by an input (IN) 152, to which the processor 154 and the memory 156 are connected. The decoded and reconstructed audio signal obtained from the software is outputted from the output (OUT) 158.

The technology described above may be used e.g. in a receiver, which can be used in a mobile device (e.g. mobile phone, laptop) or a stationary device, such as a personal computer.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for controlling a concealment method for a lost audio frame associated with a received audio signal, the method comprising:
   decoding a first audio frame of the received audio signal to obtain modified discrete cosine transform, MDCT coefficients;
   determining values of a first spectral shape based upon the MDCT coefficients decoded from the first audio frame decoded, the first spectral shape comprising a number of sub-bands;
   decoding a second audio frame of the received audio signal to obtain MDCT coefficients for the second audio frame;
   determining values of a second spectral shape based upon MDCT coefficients decoded from the second audio frame decoded, the second spectral shape comprising the number of sub-bands;
   transforming the values of the first spectral shape and a first frame energy of the first audio frame into a first representation of a first fast Fourier transform, FFT, based spectral analysis and transforming the values of the second spectral shape and a second frame energy of the second audio frame into a second representation of a second FFT spectral analysis;
   detecting, based on the first representation of the first FFT and the second representation of a second FFT, a transient condition; and
   responsive to detecting the transient condition, modifying the concealment method by selectively adjusting a spectrum magnitude of a substitution frame spectrum.

2. The method of claim 1 wherein determining the values of the first spectral shape based upon the MDCT coefficients comprises:
   determining a total magnitude of the MDCT coefficients;
   normalizing each sub-band value of the first spectral shape; and
   storing each normalized sub-band value as a value of the values of the first spectral shape.

3. The method of claim 2 wherein the total magnitude of the MDCT coefficients is determined in accordance with $$\text{shape\_tot} = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and q_d(n) are the MDCT coefficients.

4. The method of claim 3 where the normalizing of each sub-band is normalized in accordance with $$shape_{old}(k) = \frac{1}{\text{shape\_tot}} \sum_{n=grp\_bin(k)}^{grp\_bin(k+1)-1} q\_d(n)^2, \; 0 \le k < N_{grp}$$

where $shape_{old}(k)$ is a spectral shape of a sub-band (k), shape_tot is the total magnitude of the MDCT coefficients, q_d(n) are the MDCT coefficients, grp_bin(k) is a start index for the MDCT coefficients in sub-band(k), and $N_{grp}$ is a number of sub-bands.

5. The method of claim 1, wherein transforming the values of the first spectral shape and the first frame energy into the first representation of a first FFT based spectral analysis and transforming the values of the second spectral shape and the second frame energy into a second representation of a second FFT spectral analysis comprises applying a conversion factor to the values of the first spectral shape and the first frame energy and to the values of the second spectral shape and the second frame energy.

6. The method of claim 5 wherein the conversion factor depends on a sampling frequency.

7. The method of claim 4, further comprising:
transforming the values of the first spectral shape and the first frame energy into the first representation of a first FFT based spectral analysis and transforming the values of the second spectral shape and the second frame energy into a second representation of a second FFT spectral analysis in accordance with $$E_{oold}(k)=\mu \cdot shape_{oold}(k) \cdot E\_w_{oold}, 0 \leq k < N_{grp}$$

and $$E_{old}(k)=\mu \cdot shape_{old}(k) \cdot E\_w_{old}, 0 \leq k N_{grp}$$

where $E_{oold}(k)$ is the first representation, $\mu$ is the conversion factor, $shape_{oold}(k)$ is a spectral shape of a sub-band (k) of the first spectral shape, $E\_w_{oold}$ is the first frame energy, $E_{old}(k)$ is the second representation, $shape_{old}(k)$ is a spectral shape of a sub-band (k) f the second spectral shape, $E\_w_{old}$ is the second frame energy, and $N_{grp}$ is the number of sub-bands.

8. The method of claim 7 further comprising:
determining if a ratio between the respective band energies of the frames associated with $E_{oold}(k)$ and $E_{old}(k)$ is above a threshold value; and
responsive to the ratio being above the threshold value, modifying the concealment method by selectively adjusting the spectrum magnitude of the substitution frame spectrum.

9. The method of claim 8 wherein the substitution frame spectrum is calculated according to an expression of $$Z(m)=\alpha(m) \cdot \beta(m) \cdot Y(m) \cdot e^{j(\theta_k + \vartheta(m))}$$

and adjusting the spectrum magnitude comprises adjusting $\beta(m)$, where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

10. The method of claim 1, further comprising:
storing the determined values of the first spectral shape in a $shape_{old}$ buffer;
determining the first frame energy of the first audio frame and storing the determined first frame energy in an $E\_w_{old}$ buffer;
responsive to decoding the second audio frame, moving the determined values of the first spectral shape from the $shape_{old}$ buffer to a $shape_{oold}$ buffer;
moving the determined first frame energy from the $E\_w_{old}$ buffer to an $E\_w_{oold}$ buffer;
storing the determined values of the second spectral shape in the $shape_{old}$ buffer;
determining the second frame energy of the second audio frame and storing the determined second frame energy in the $E\_w_{old}$ buffer.

11. The method of claim 1 wherein frame energy of each of the first frame energy and the second frame energy is determined in accordance with $$E\_w_{oold} = E\_w_{old}$$

$$E\_w_{old} = \sum_{n=0}^{L_{prot}-1} (w_{whr}(n) \cdot x_{prev}(n))^2$$

where $E\_w_{oold}$ is a previous frame energy, $E\_w_{old}$ is the frame energy of the first frame being calculated or the second frame being calculated, $w_{whr}$ is a long FFT spectral analysis window, $x_{prev}$ is a time domain prototype signal used to create a substitution for a potentially upcoming lost frame, and $L_{prot}$ is a number of samples in the $x_{prev}$ signal.

12. A decoder configured to control a concealment method for a lost audio frame associated with a received audio signal, the decoder apparatus comprising:
a processor; and
a memory storing instructions that, when executed by the processor, cause the decoder to perform operations comprising:
decoding a first audio frame of the received audio signal to obtain modified discrete cosine transform, MDCT coefficients;
determining values of a first spectral shape based upon MDCT coefficients decoded from the first audio frame decoded, the first spectral shape comprising a number of sub-bands;
decoding a second audio frame of the received audio signal;
determining values of a second spectral shape based upon MDCT coefficients decoded from the second audio frame decoded, the second spectral shape comprising the number of sub-bands;
transforming the values of the first spectral shape and a first frame energy of the first audio frame into a first representation of a first fast Fourier transform, FFT, based spectral analysis and transforming the values of the second spectral shape and a second frame energy of the second audio frame into a second representation of a second FFT spectral analysis;
detecting, based on the first representation of the first FFT and the second representation of a second FFT, a transient condition; and
responsive to detecting the transient condition, modifying the concealment method by selectively adjusting a spectrum magnitude of a substitution frame spectrum.

13. The decoder of claim 12 wherein to determine the values of the first spectral shape based upon decoded MDCT coefficients, the instructions comprise further instructions that, when executed by the processor, cause the apparatus to perform operations comprising:
determining a total magnitude of the MDCT coefficients;
normalizing each sub-band value of the first spectral shape; and
storing each normalized sub-band value as a value of the values of the first spectral shape.

14. The decoder of claim 13 wherein the total magnitude of the MDCT coefficients is determined in accordance with $$shape\_tot = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and q_d(n) are the MDCT coefficients.

15. The decoder of claim 14 where the normalizing of each sub-band is normalized in accordance with $$shape_{old}(k) = \frac{1}{shape\_tot} \sum_{n=grp\_bin(k)}^{grp\_bin(k+1)-1} q\_d(n)^2, 0 \le k < N_{grp}$$

where $shape_{old}(k)$ is a spectral shape of a sub-band (k), shape_tot is the total magnitude of the MDCT coefficients, q_d(n) are the MDCT coefficients, grp_bin(k) is a start index for the MDCT coefficients in sub-band(k), and $N_{grp}$ is the number of sub-bands.

16. The decoder of claim 12, wherein to transform the values of the first spectral shape and the first frame energy into the first representation of a first FFT based spectral analysis and to transform the values of the second spectral shape and the second frame energy into a second representation of a second FFT spectral analysis, the instructions comprise further instructions that, when executed by the processor, cause the apparatus to perform operations comprising:
applying a conversion factor to the values of the first spectral shape and the first frame energy and to the values of the second spectral shape and the second frame energy.

17. The decoder of claim 16 wherein the conversion factor depends on a sampling frequency.

18. The decoder of claim 16, further comprising:
transforming the values of the first spectral shape and the first frame energy into the first representation of a first FFT based spectral analysis and transforming the values of the second spectral shape and the second frame energy into a second representation of a second FFT spectral analysis in accordance with $$E_{oold}(k) = \mu \cdot shape_{oold}(k) \cdot E\_w_{oold}, 0 \le k < N_{grp}$$

and $$E_{old}(k) = \mu \cdot shape_{old}(k) \cdot E_{w_{old}}, 0 \le k < N_{grp}$$

where $E_{oold}(k)$ is the first representation, $\mu$ is the conversion factor, $shape_{oold}(k)$ is a spectral shape of a sub-band (k) of the first spectral shape, $E\_w_{oold}$ is the first frame energy, $E_{old}(k)$ is the second representation, $shape_{old}(k)$ is a spectral shape of a sub-band (k) f the second spectral shape, $E\_w_{old}$ is the second frame energy, and $N_{grp}$ is the number of sub-bands.

19. The decoder of claim 18 wherein the instructions comprise further instructions that, when executed by the processor, cause the apparatus to perform operations further comprising:
determining if a ratio between the respective band energies of the frames associated with $E_{oold}(k)$ and $E_{old}(k)$ is above a threshold value based on $E_{oold}(k)$ and $E_{old}(k)$; and
responsive to the ratio being above the threshold value, modifying the concealment method by selectively adjusting the spectrum magnitude of the substitution frame spectrum.

20. The decoder of claim 19 wherein the substitution frame spectrum is calculated according to an expression of $$Z(m) = \alpha(m) \cdot \beta(m) \cdot Y(m) e^{j(\theta_k + \vartheta(m))}$$

and adjusting the spectrum magnitude comprises adjusting $\beta(m)$, where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

21. The decoder of claim 12, further comprising:
storing the determined values of the first spectral shape in a $shape_{old}$ buffer;
determining the first frame energy of the first audio frame and storing the determined first frame energy in an $E\_w_{old}$ buffer;
responsive to decoding the second audio frame, moving the determined values of the first spectral shape from the $shape_{old}$ buffer to a $shape_{oold}$ buffer;
moving the determined first frame energy from the $E\_w_{old}$ buffer to an $E\_w_{oold}$ buffer;
storing the determined values of the second spectral shape in the $shape_{old}$ buffer;
determining the second frame energy of the second audio frame and storing the determined second frame energy in the $E\_w_{old}$ buffer.

22. The decoder of claim 21 wherein frame energy of the first frame energy and the second frame energy is determined in accordance with $$E\_w_{oold} = E\_w_{old}$$

$$E\_w_{old} = \sum_{n=0}^{L_{prot}-1} (w_{whr}(n) \cdot x_{prev}(n))^2$$

where $E\_w_{oold}$ is a previous frame energy, $E\_w_{old}$ is the frame energy of the first frame being calculated or the second frame being calculated, $w_{whr}$ is a long FFT spectral analysis window, $x_{prev}$ is a time domain prototype signal used to create a substitution for a potentially upcoming lost frame, and $L_{prot}$ is a number of samples in the $x_{prev}$ signal.

* * * * *